(12) United States Patent
Bauer

(10) Patent No.: US 8,892,570 B2
(45) Date of Patent: Nov. 18, 2014

(54) METHOD TO DYNAMICALLY DESIGN AND CONFIGURE MULTIMEDIA FINGERPRINT DATABASES

(75) Inventor: Claus Bauer, Beijing (CN)

(73) Assignee: Dolby Laboratories Licensing Corporation, San Francisco, CA (US)

(*) Notice: Subject to any disclaimer, the term of this patent is extended or adjusted under 35 U.S.C. 154(b) by 259 days.

(21) Appl. No.: 13/511,525

(22) PCT Filed: Dec. 9, 2010

(86) PCT No.: PCT/US2010/059767
§ 371 (c)(1),
(2), (4) Date: May 23, 2012

(87) PCT Pub. No.: WO2011/087648
PCT Pub. Date: Jul. 21, 2011

(65) Prior Publication Data
US 2012/0278326 A1    Nov. 1, 2012

Related U.S. Application Data

(60) Provisional application No. 61/289,051, filed on Dec. 22, 2009.

(51) Int. Cl.
*G06F 17/30* (2006.01)
*G06K 9/62* (2006.01)

(52) U.S. Cl.
CPC ............ *G06F 17/30743* (2013.01); *G06K 9/62* (2013.01); *G06K 9/6262* (2013.01); *G06F 17/30781* (2013.01); *G06F 17/3002* (2013.01); *G06F 17/30949* (2013.01); *G06F 17/30758* (2013.01); *G06F 17/30575* (2013.01)
USPC ............ 707/743; 707/737; 707/741

(58) Field of Classification Search
CPC .................. G06F 17/30212; G06F 17/30067; G06F 17/30097; G06F 17/30194; G06F 17/30949; G06F 17/30575; G06F 17/30743; G06F 17/30017; G06F 17/3002; G06F 17/30023; G06F 17/30026; G06F 17/30047; G06F 17/30; G06F 17/30758

USPC ......... 707/737, 741, 748, 758, 783, 802, 661, 707/827; 709/203, 217, 246; 715/255
See application file for complete search history.

(56) References Cited

U.S. PATENT DOCUMENTS

| | | | |
|---|---|---|---|
| 8,635,211 B2* | 1/2014 | Jiang et al. | 707/723 |
| 2002/0178410 A1 | 11/2002 | Haitsma | |
| 2004/0172411 A1 | 9/2004 | Herre | |
| 2007/0033163 A1* | 2/2007 | Epstein et al. | 707/716 |
| 2007/0047002 A1* | 3/2007 | Hull et al. | 358/3.28 |
| 2011/0153050 A1 | 6/2011 | Bauer | |
| 2011/0216937 A1 | 9/2011 | Radhakrishnan | |
| 2012/0054194 A1 | 3/2012 | Gao | |

OTHER PUBLICATIONS

Varna, A.L., et al. "A Decision Theoretic Framework for Analyzing Binary Hash-Based Content Identification Systems" Proceedings of DRM 2008.
McCarthy, E., et al. "A Framework for Soft Hashing and its Applications to Robust Image Hashing" IEEE Conference on Image Proc., vol. 1, pp. 397-400, Oct. 2004.
Cano, P., et al. "A Review of Algorithms for Audio Fingerprinting" Proc. of the 2003 IEEE Radar Conference, Huntsville, AL, May 5-8, 2003, pp. 169-173.
Haitsma, J., et al. "A Highly Robust Audio Fingerprinting System" Internet Citation, Oct. 17, 2002.

* cited by examiner

*Primary Examiner* — Shahid Alam

(57) ABSTRACT

Techniques are provided for dynamic configuration of search parameters for multimedia fingerprint databases that use weak bits. A multimedia fingerprint database, which stores reference fingerprints and uses weak bits, is maintained. Maintaining the database includes dynamically configuring one or more of the following parameters: a fingerprint length of those portions of the reference fingerprints that are used to identify multimedia objects; an index length of the index used to index those portions of the reference fingerprints that are used to identify multimedia objects; a threshold that is used to determine whether multimedia objects are correctly identified; and a number of the weak bits in the reference fingerprints.

15 Claims, 5 Drawing Sheets

METHOD TO DYNAMICALLY DESIGN AND CONFIGURE MULTIMEDIA FINGERPRINT DATABASES

CROSS-REFERENCE TO RELATED APPLICATIONS

This application claims priority to U.S. Provisional Patent Application No. 61/289,051 filed 22 Dec. 2009, which is hereby incorporated by reference in its entirety.

TECHNICAL FIELD

The present disclosure relates to multimedia fingerprint databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As a result of widespread and growing use, vast quantities of media content exist nowadays. Given the sheer quantity and variety of audio and video content that exists in various formats and encodings, and the expanding growth of that content over time, the ability to correctly identify media content is of particular value. One type of approaches for identifying media content is based on the use of media fingerprints.

Media fingerprints are identifiers of the media content from which the media fingerprints are derived, extracted, or generated. For example, acoustic fingerprints may be derived or otherwise generated from a particular audio waveform as code that uniquely corresponds thereto, and video fingerprints may be derived or otherwise generated from a particular video sequence based on video content characteristics such as luminance, chrominance, and motion descriptors. Media fingerprints may be stored in reference databases in association with various metadata information that describe and identify the media content objects from which the individual fingerprints are generated. The stored media fingerprints may be accessed to identify, categorize, or otherwise classify an object or a sample of media content, such as music or other audio content and a video sequence or other video content. Such identification, categorization, and classification of media content may be useful in a variety of contexts such as copyright management, validation of authorized uses of content, and detection of unauthorized use of various versions, copies, and other items of content.

BRIEF DESCRIPTION OF THE DRAWINGS

In the figures of the accompanying drawings like reference numerals refer to similar elements.

DESCRIPTION OF EXAMPLE EMBODIMENTS

Figure 1:
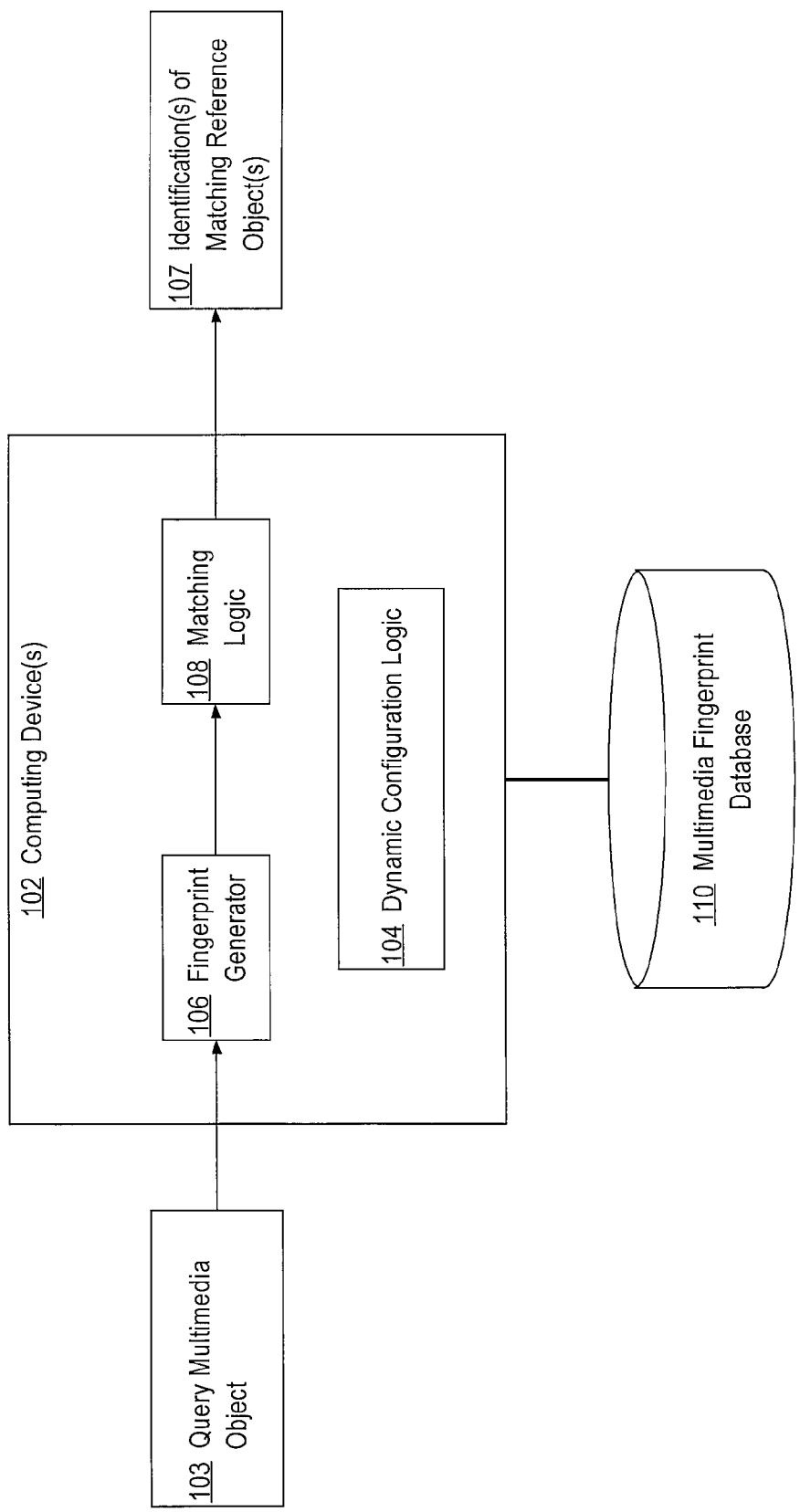
FIG. 1 is a block diagram that illustrates an example system in which embodiments of the techniques described herein may be implemented.

Techniques are provided for dynamic configuration of search parameters for hash-table based multimedia fingerprint databases that use weak bits. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
    2.0 Example Operational Contexts
    3.0 Terminology
    4.0 Multimedia Fingerprint Databases that Use Weak Bits
    5.0 Analytic Model of the Fingerprint Search Operation
    6.0 Method for Dynamically Configuring Search Parameters for Multimedia Fingerprint Databases that Use Weak Bits
    7.0 Implementation Mechanisms—Hardware Overview 1.0 Overview This section provides a conceptual prelude to techniques that are described in more detail in the sections that follow. Therefore, this section should not be read as a summary of the techniques described herein and is to be considered in an illustrative rather than a restrictive sense.

As used herein, "fingerprint" (also referred to as "multimedia fingerprint") may relate to a sequence of bits that represents a multimedia object. "Multimedia object" relates to an item or unit of media content. Examples of multimedia objects include, but are not limited to, an audio file, a video file, an identifiable portion or segment of an audio stream, an identifiable portion or segment of a video stream, and any item or unit that may have any other type of media content. In some embodiments, a fingerprint is derived by applying a hash function to a multimedia object. However, it is noted that the techniques described herein are not limited to using any particular type of function to derive fingerprints; rather, various embodiments may use various now-known or later-developed functions and mechanisms to derive fingerprints from multimedia objects. It is also noted that the techniques described herein apply to fingerprints in the same way regardless of the type of content (e.g., audio, video, etc.) that is stored in the multimedia objects from which the fingerprints are derived.

As used herein, "reference fingerprint" may relate to a fingerprint that is extracted, derived, or otherwise generated from a known and identified multimedia object (also referred to as "reference multimedia object"). "Query fingerprint" relates to a fingerprint that is extracted, derived, or otherwise generated from a multimedia object (also referred to as "query multimedia object") that needs to be identified or otherwise detected.

Content identification based on fingerprints generally involves searching for the best matches between reference fingerprints (or portions thereof) that are stored in a multimedia fingerprint database and one or more query fingerprints (or portions thereof) that are generated from a query multimedia object that needs to be identified. A multimedia fingerprint database refers to a repository of reference fingerprints in which each reference fingerprint is associated with metadata information that describes and identifies the reference multimedia object from which that reference fingerprint was derived. Examples of such metadata information include, but are not limited to, a content identifier (e.g., a filename, a stream ID, etc.), a content description, and a time location (or offset) of the fingerprint within the multimedia object from which the fingerprint was derived. In some embodiments, in addition to reference fingerprints and metadata information associated therewith, a multimedia fingerprint database may also include, or otherwise reference, the actual reference multimedia objects from which the reference fingerprints are derived. For the purposes of content identification, when a search for one or more query fingerprints is performed against a multimedia reference database, the search can return at least the metadata information associated with those reference fingerprint(s) which best match the one or more query fingerprints.

In the present disclosure, we particularly focus on multimedia fingerprint databases implemented in the form of a hash-table. We will however not always explicitly mention this and for the sake of briefness merely talk about a multimedia fingerprint database. Moreover, the techniques in this disclosure are described for dynamic configuration of search parameters for multimedia fingerprint databases that use weak bits. (the notion of weak bits will be explained in sections 3.0 and 4.0) As used herein, "parameter" may relate to a data item that can be assigned different values. "Dynamically configuring" (or "dynamic configuration") relates to automatically determining and assigning, at different times during the lifetime of a multimedia fingerprint database, different values to search parameters that control or otherwise govern the manner in which query fingerprints are searched against the reference fingerprints stored in the multimedia fingerprint database.

In one embodiment according to the techniques described herein, maintaining a multimedia fingerprint database, which stores reference fingerprints and uses weak bits, comprises dynamically configuring one or more of the following search parameters: a fingerprint length of those portions of the reference fingerprints that are used to identify multimedia objects; an index length of the index used to index those portions of the reference fingerprints that are used to identify multimedia objects; a threshold that is used to determine whether multimedia objects are correctly identified; and a number of the weak bits in the reference fingerprints. At any given time, the values of these search parameters determine the various probabilities associated with performing an accurate identification of a query multimedia object against the multimedia fingerprint database, where the probabilities include a probability of false positive, a probability of correct identification, a probability of misclassification, and a probability of detection. The techniques described herein provide a set of formulas that can be used to compute these probabilities based on the values of the above search parameters. Thus, when the various probabilities associated with performing accurate content identifications need to be set to certain target levels, the techniques described herein allow the values of one or more of the above search parameters to be dynamically configured so that the certain target levels are met. Since the values of the above search parameters directly affect the amount of computing resources (e.g., memory, CPU time, etc.) that is expended to perform content identifications against the multimedia fingerprint database, by allowing dynamic configuration of the above search parameters the techniques described herein provide for optimal usage of the computing resources.

2.0 Example Operational Contexts

Most applications operable to perform content identification based on fingerprints rely on the following fingerprint system architecture. Initially, a reference database (e.g., such as a multimedia fingerprint database) of multimedia fingerprints is built. The reference database contains the fingerprints of all multimedia objects the application shall recognize. During operation, a query fingerprint of a query multimedia object is compared against the reference database using specific matching mechanisms. The fingerprint matching mechanism decides if the query fingerprint of the query multimedia object corresponds to a fingerprint in the reference database. Fingerprint matching mechanisms use techniques from statistics and fuzzy logic.

Multimedia fingerprint applications commonly use large fingerprint reference databases. In some applications, hash-table based database designs may be used, and the reference databases may be indexed using an index pointing to entries, where each entry is a fingerprint. In some applications, the index is a subset of the fingerprint. The present disclosure only considers fingerprint systems in which the index is a part or portion of the fingerprint. The size of the fingerprint, the size of the index of the fingerprint, the value of the threshold that is used to determine whether multimedia objects are correctly identified, and the number of the weak bits in the reference fingerprints influence the following performance criteria of a multimedia fingerprint system:

The accuracy of the fingerprint matching mechanism. (The notion of accuracy will be discussed hereinafter in section 3.0.)

The storage requirements of the reference database.

The speed of the database search.

In practice, it is particularly important to find a size of the fingerprint, a size of the index of the fingerprint, the value of the threshold that is used to determine whether multimedia objects are correctly identified, and the number of the weak bits in the reference fingerprints that satisfy the accuracy requirement and that do not significantly compromise the later two requirements. As shown in the present disclosure, the optimal choice of the fingerprint length, the optimal choice of the index length, the optimal choice of a threshold parameter $\tau$, and the optimal choice of the number of weak bits is a function of the database size, the accuracy requirements, the probability with which fingerprint bits change when the multimedia object is modified, and the probability with which a weak bit prediction is correct. For an audio file, a modification could be a transcoding of the content, a pitch-shift, etc. For a video file, a modification could be a rotation or a cropping of the video. The present disclosure describes a model to analyze the impact of the fingerprint size, the index size, the value of the threshold, and the number of weak bits on the accuracy of a system that performs content identification based on fingerprints. The present disclosure also describes techniques that use this model to design a multimedia fingerprint database and to dynamically configure and reconfigure search parameters (e.g., such as the fingerprint size, the index size, the value of the threshold, and the number of weak bits) for the multimedia fingerprint database. As used herein, "model" may relate to a set of formulas that describe one or more probabilities that can be derived based on the values of one or more search parameters of a multimedia fingerprint database. "Formula" refers to an empirical rule that can be used to compute the values of one or more output parameters from the values of one or more input parameters.

FIG. 1 is a block diagram that illustrates an example system in which embodiments of the techniques described herein may be implemented. One or more computing device(s) 102 are communicatively or operatively connected to multimedia fingerprint database 110.

Multimedia fingerprint database 110 is configured to store reference fingerprints in accordance with the techniques described herein. Multimedia fingerprint database 110 may be organized as any suitable data repository including, but not limited to, a relational database, an object-relational database, and a set of one or more files in one or more file systems.

Computing device(s) 102 are configured to execute dynamic configuration logic 104, fingerprint generator 106, and matching logic 108. For example, dynamic configuration logic 104, fingerprint generator 106, and matching logic 108 may be included in a search engine that can be executed by computing device(s) 102. In another example, dynamic configuration logic 104, fingerprint generator 106, and matching logic 108 may be included in one or more servers, services, daemons, and/or in any computer processes that can be executed by computing device(s). In yet another example, dynamic configuration logic 104, fingerprint generator 106, and matching logic 108 may be implemented as a standalone or a client-server application or module that may be configured in various computing environments including, but not limited to, a network-capable media player, a content encoder and/or decoder, a web search server, an indexing server, and a web browser. It is noted that the techniques described herein are not limited to being implemented as any particular type of entity, and for this reason the example implementations for dynamic configuration logic 104, fingerprint generator 106, and matching logic 108 described herein are to be regarded in an illustrative rather than a restrictive sense. For example, in various embodiments and implementations, dynamic configuration logic 104, fingerprint generator 106, and matching logic 108 may be configured to execute in one or more special-purpose computing devices, which may operate under control of instructions that are encoded in various storage media.

Further, in various embodiments, dynamic configuration logic 104, fingerprint generator 106, and matching logic 108 may be implemented as separate components or as one integrated component that may perform additional functionalities. As used herein, "logic" may relate to a set of instructions which, when executed by one or more processors, are operable to perform one or more functionalities. In various embodiments and implementations, any such logic may be implemented as one or more software components that are executable by one or more processors, as one or more hardware components such as Application-Specific Integrated Circuits (ASICs) or other programmable Integrated Circuits (ICs), or as any combination of software and hardware components. For example, any particular logic may be implemented, without limitation, as one or more software modules, as one or more libraries of functions, as one or more dynamically linked libraries, as a standalone or a client-server software application, and as a browser plug-in. As used herein, "server" may relate to a combination of software components and an allocation of computing resources, such as memory, CPU time, and/or disk storage space where, when executed and allocated the computing resources, the software components are operable to perform one or more functionalities. "Client" refers to a combination of software components and an allocation of computing resources where, when executed and allocated the computing resources, the software components are operable to perform some functionality themselves and also to request the performance of some functionality (e.g., services) from a server.

According to the techniques described herein, fingerprint generator 106 is logic operable to derive fingerprints from multimedia objects. For example, as part of maintaining multimedia fingerprint database 110, fingerprint generator 106 may be operable to derive reference fingerprints from reference multimedia objects and to store the reference fingerprints in multimedia fingerprint database 110. As part of performing searches against multimedia fingerprint database 110, fingerprint generator 106 may also be operable to generate query fingerprints from query multimedia objects (e.g., portions of content input streams and/or media files), and to pass the derived query fingerprints to matching logic 108.

According to the techniques described herein, dynamic configuration logic 104 is operable to dynamically configure search parameters that are associated with multimedia fingerprint database 110. For example, dynamic configuration logic 104 is operable to automatically determine and dynamically configure one or more of the following search parameters: the size of those portions of the reference fingerprints that are used by matching logic 108 to match a query fingerprint to the reference fingerprints stored in multimedia fingerprint database 110; the size of those portions of fingerprint indexes, on the reference fingerprints, that are used by matching logic 108 to match a query fingerprint to the reference fingerprints; a threshold that is used by matching logic 108 to determine whether multimedia objects are correctly identified; and a number of the weak bits in the reference fingerprints. At any given time, dynamic configuration logic 104 is operable to modify the values of these search parameters and to determine the various probabilities associated with performing an accurate identification of a query multimedia object against multimedia fingerprint database 110. For example, dynamic configuration logic 104 may use the set of formulas of the model described hereinafter to iteratively compute, based on different values of one or more of the above search parameters at each iteration, the values for one or more of the following probabilities: a probability of false positive, a probability of correct identification, a probability of misclassification, and a probability of detection; wherein, at each iteration, dynamic configuration logic 104 may compare the computed values of one or more of these probabilities to corresponding target values that have been set for these one or more probabilities. When dynamic configuration logic 104 finds values for the above search parameters that meet the target probability values, dynamic configuration logic 104 configures, or assigns, the found values to the above search parameters so that matching logic 108 can use these values to compare query fingerprints against the reference fingerprints stored in multimedia fingerprint database 110.

Matching logic 108 is operable to compare query fingerprints to the reference fingerprints stored in multimedia fingerprint database 110 and to return any reference fingerprint(s), and/or the metadata information associated therewith, that match the input query fingerprint(s). Specifically, when comparing query fingerprints to reference fingerprints in multimedia fingerprint database 110, matching logic 108 is operable to use the current values that are configured by dynamic configuration logic 104 for one or more search parameters of the multimedia fingerprint database such as, for example: the size of those portions of the reference fingerprints that are used for matching; the size of those portions of fingerprint indexes, on the reference fingerprints, that are used for matching; a threshold that is used to determine whether the input query multimedia objects are correctly identified; and the number of the weak bits in the reference fingerprints.

In an operational example, a search engine executing on computing device(s) 102 may receive query multimedia object 103, which can be a media file or a portion of a content stream. In response to receiving query multimedia object 103, fingerprint generator 106 is invoked. Fingerprint generator 106 derives one or more query fingerprints from query multimedia object 103, and then sends the one or more query fingerprints to matching logic 108. Using the current values of the search parameters that are currently configured by dynamic configuration logic 104, matching logic 108 compares the one or more query fingerprints against the reference fingerprints stored in multimedia fingerprint database 110. If matching logic 108 finds some reference fingerprints that match any one of the query fingerprints, matching logic 108 returns output data 107 that may include at least some of the metadata information associated with the matching reference fingerprints such as, for example, the content identifiers (e.g., a filename, a stream ID, etc.) associated with the matching reference fingerprints, a content description of the reference multimedia objects identified by the matching reference fingerprints, and a time location (or offset) of each matching reference fingerprint within the reference multimedia object from which that reference fingerprint was derived.

The rest of the present disclosure is organized as follows. Section 3.0 describes some terminology that is used throughout the present disclosure and that is related to various parameters of a multimedia fingerprint database. Section 4.0 describes an example multimedia fingerprint database that uses weak bits. Section 5.0 describes a detailed analytic model relating to probabilities associated with a multimedia fingerprint database that uses weak bits. Section 6.0 describes how this analytical model can be used to automatically determine and dynamically change search parameters (e.g., such as fingerprint size and index size) that are used for matching query fingerprints to the reference fingerprints stored in a multimedia fingerprint database that uses weak bits.

3.0 Terminology

In some embodiments, a fingerprint is a function of a multimedia object. For example, a hash function H with argument x (=multimedia object) returns a Hash h (e.g., h=H (x)), which is referred to as the fingerprint of multimedia object x. According to the techniques described herein, an index (also referred to as "fingerprint index") on a fingerprint is a part or portion of the fingerprint but not the entire fingerprint. For example, a fingerprint is a sequence of bits of length L, and a Hash function H can indeed be parameterized using the parameter L, e.g. $H(x)=H_L(x)$ can be set such that $h=H_L(x)$ is a sequence of L bits. The length (or size) of the index is denoted by I and, since the index is a portion of the fingerprint, it follows that I<L. In this document we do not specify how the I index bits are chosen from the L fingerprint bits. We only require that the procedure to determine the index bits is identical for all considered fingerprints. The accuracy of a system for content identification based on fingerprints is defined via the notions of robustness and sensitivity. Depending on the particular application or embodiment, fingerprints are required to be robust against changes of the multimedia object from which they are derived—for example, a modification of the multimedia object that does not prevent a human being from recognizing that the modified and the unmodified multimedia object contain the same content, should only lead to a relatively small change of the fingerprint. Fingerprints are also required to be sensitive to content—for example, fingerprints derived from different multimedia content must differ significantly. In order to analytically describe and model the notions of robustness and sensitivity, the techniques described herein use the following probabilities:

$P_f$—Probability of false positive: The probability that a query fingerprint, which in fact does not correspond to any reference fingerprint in the multimedia fingerprint database, is erroneously declared to correspond to a reference fingerprint in the database.

$P_c$—Probability of correct identification: The probability that a query fingerprint, which in fact corresponds to a reference fingerprint in the multimedia fingerprint database, is correctly declared to correspond to this reference fingerprint in the database.

$P_m$—Probability of misclassification: The probability that a query fingerprint, which in fact corresponds to a reference fingerprint in the multimedia fingerprint database, is erroneously declared to correspond to a different fingerprint in the database.

$P_d$—Probability of detection: The probability that a query fingerprint, which in fact corresponds to a reference fingerprint in the multimedia fingerprint database, is declared to correspond to some reference fingerprint in the database. Clearly, $$P_d=P_c+P_m. \qquad (3.1)$$

In order to describe the operation of an example hash-based multimedia fingerprint database that uses weak bits, the techniques described herein use the following notions, probabilities, and parameters:

Collision: Depending on the fingerprint extraction mechanism and on the way the index is chosen as a portion of the fingerprint, the fingerprints of two or more different multimedia objects might be indexed by the same index value. This scenario, where indexes of fingerprints of different multimedia objects collide, is called a collision.

For purposes of illustration, and in order to simplify the calculations described hereinafter, it is assumed that for each index value the expected, average number of collisions is identical. The average number of collisions per index is denoted as D.

Weak bits: Weak bits are also sometimes referred to as unreliable bits. As described above, a multimedia fingerprint can be conceived as a sequence of bits. When the multimedia object, from which a fingerprint is derived, is modified, the fingerprint of the modified multimedia object might change as well. When the fingerprint of a query multimedia object is derived, each of the I index bits, from the L fingerprint bits, that constitute the index of the fingerprint, is classified as either a weak/unreliable bit or as a reliable bit. The concept of weak/unreliable and reliable bits is defined as follows. Fingerprints are typically designed such that the fingerprint of a reference multimedia object and the fingerprint of a modified version of the multimedia object differ only by few bits. Each of the I bits of the fingerprint index, on the fingerprint of a reference multimedia object, has a certain probability to change when the reference multimedia object is modified. The bits which change with a high probability are called weak or unreliable bits, whereas the bits with a low probability of change are called reliable bits.

$P_W$—Probability of correct weak bit prediction: Assuming that a query fingerprint in fact corresponds to a reference fingerprint in the multimedia fingerprint database, this probability denotes the probability that the reliable bits of the fingerprint index on the query fingerprint are identical with the corresponding bits of the fingerprint index on the reference fingerprint of the reference multimedia object. In other words, $P_W$ denotes the probability that the weak bit prediction is correct. Using common notation, $P_{W^c} = 1 - P_W$ is defined as the probability that the reliable bits of the fingerprint index, on the query fingerprint of a query multimedia object, are not identical with the corresponding bits of the fingerprint index on the reference fingerprint of the reference multimedia object. Further, by $P_{A/W}(P_{A/W^c})$ we denote the conditional probability of an event A given that the weak bit prediction is correct (wrong).

p: p defines the probability that an individual bit, from the L-I bits that do not belong to the index of a fingerprint that is derived from a multimedia object, changes when the multimedia object is modified. The value of the parameter p depends on the design of the fingerprint extraction mechanism and on the signal modifications that the fingerprint extraction mechanism is designed to catch.

It is noted that in practice, the quantities p and $P_W$ tend to be related as both the index and the remaining L-I bits are part of the same fingerprint and therefore the robustness to modifications of the I index bits is likely to be correlated with the robustness of the remaining L-I bits. For purposes of clarity and illustration, however, the present disclosure does not consider the possible correlation of p and $P_W$; rather, in the present disclosure it is assumed that both quantities p and $P_W$ can be independently measured, and the measured values are used as input parameters for the model described hereinafter in section 5.0.

4.0 Hash-Table Based Multimedia Fingerprint Databases that Use Weak Bits

This section describes the operation of an example hash-table based multimedia fingerprint database in which the techniques described herein for dynamic configuration of search parameters may be implemented.

In an example embodiment, reference fingerprints are derived from reference multimedia objects. The reference fingerprints are then stored in a multimedia fingerprint database and are indexed by index values. It is noted that a given part of a multimedia object might be represented by more than one reference fingerprint in the multimedia fingerprint database. For example, suppose that a particular video clip is 3 minutes long. In a particular operational context, it might be of interest to identify not only the video clip as a whole, but also the point of time in the video clip that matches with an accuracy of, for example, 10 seconds. Further, suppose that the fingerprint length is decided to be 12 seconds for reasons specific to the particular operational context and the specific fingerprint. Then, using a sliding window every 10 seconds, a fingerprint of 12 seconds length is taken. This implies that most parts of the video clip are represented by more than fingerprint each of which is indexed by a separately index value in the multimedia fingerprint database.

In this example embodiment, the index (also referred to as "index value") is defined as a portion of the fingerprint but not the entire fingerprint. When a query multimedia object is queried against the multimedia fingerprint database, the query fingerprint of the query multimedia object is extracted. According to the techniques described herein, the I bits of the fingerprint that constitute the index value are divided into $W \le I$ unreliable/weak and I-W reliable bits. In this document, we do not discuss according to which procedure in detail the W weak bits are chosen. Then, a total of most $2^W$ index values in the multimedia fingerprint database are considered, where the $2^W$ index values are all indexes that have the same I-W reliable bits as the index of the query fingerprint of the query multimedia object. The number of these index values is equal to $2^W$ as all possible permutations of the W unreliable bits are stored as index values in the multimedia fingerprint database.

It is noted that each of the $2^W$ index values can index more than fingerprint. As discussed in section 3.0, the average number of collisions for each of the $2^W$ indexes is D. Thus, the $2^W$ index values can index a total of $$N = D \sum_{i=0}^{W} C_W^i = D 2^W \qquad (4.2)$$

fingerprints. In formula (4.2), $C_W^i$ denotes the binomial coefficient $$\binom{W}{i}.$$

In accordance with the techniques described herein, a fingerprint matching mechanism calculates the N Hamming distances between the query fingerprint of the query multimedia object and each of the N fingerprints in the multimedia database indexed by the $2^W$ indices. as described above. (As used herein, "Hamming distance" may relate to the number of bit positions at which two sequences having equal number of bits are different—for example, the bit sequences "1011101" and "1001001" have a Hamming distance of 2.) Subsequently, that one fingerprint among the N fingerprints, which has the lowest Hamming distance to the query fingerprint of the query multimedia object, is selected. If the lowest Hamming distance is achieved by more than one of the N reference fingerprints, then one of these fingerprints is picked randomly. If the Hamming distance for the selected fingerprint is not bigger than a pre-defined threshold τ, then this fingerprint is declared to represent (or otherwise match) the query multimedia object. If the lowest Hamming distance is bigger than the pre-defined threshold τ, then the query multimedia object is declared as not corresponding to any of the reference multimedia objects that are represented by reference fingerprints in the multimedia fingerprint database.

5.0 Analytic Model of the Fingerprint Search Operation

Subsection 5.1 of this section describes a general framework for modeling fingerprint-based content identification systems. Subsection 5.2 of this section derives an analytic model that describes the operation of multimedia fingerprint databases that use weak bits.

5.1 Framework for Modeling Fingerprint-Based Content Identification Systems

A general framework for modeling fingerprint-based content identification systems is described hereinafter with respect to an example embodiment. It is noted, however, that this example embodiment is provided for illustrative purposes and is therefore to be regarded in an illustrative rather than a restrictive sense.

In an example embodiment, a multimedia fingerprint database stores U multimedia objects. As described in section 4.0, for each database search, we do not consider the fingerprints of all U multimedia objects, however as outlined in section 4, we only consider $N \le U$ multimedia objects $V_1, \ldots, V_N$ with fingerprints $X_1, \ldots, X_N$ where N is defined in (4.2). Each fingerprint is of length L and has an index of length I where I<L. In order to simplify the discussion for illustration purposes, it is assumed that no two fingerprints $X_i$ in the multimedia fingerprint database are identical. For each query multimedia object Z, which shall be against identified by a match versus the reference database, the fingerprint Y of Z is computed. A fingerprint matching mechanism decides if the multimedia object Z corresponds to any of the N multimedia objects $V_1, \ldots, V_N$. In order to define this theoretic framework as a multiple hypothesis test, the following hypotheses are defined:

$H_0$: Z does not correspond to any of the multimedia objects $V_1, \ldots, V_N$ $H_i$, $1 \leq i \leq N$: Z corresponds to the multimedia object $V_i$ The input to a fingerprint matching mechanism are the N Hamming distances $d_i = d(V_i, Y)$, $i=1, \ldots, N$ which respectively denote the N Hamming distances between the fingerprints Y of the query multimedia object Z and the fingerprints $X_1, \ldots, X_N$ of the N multimedia objects $V_1, \ldots, V_n$. It is noted that in this example embodiment, it is assumed that the individual fingerprint bits are independent in order to achieve a higher fingerprint robustness against signal modification. Further, it is assumed that the fingerprint bits are equally likely to be 0 or 1 such that the overall entropy is maximized. It is also noted that signal modifications lead to changes in the fingerprint space which can be modeled as additive noise. The effect of attacks on fingerprint bits is modeled by the probability p that was defined heretofore in section 3.0.

As discussed heretofore in section 4.0, the L bits of the fingerprint consist of the I bits that constitute the index (or the index value) and the remainder consists of the L–I bits. Thus, $d_i = d_{I,i} + d_{R,i}, 1 \leq i \leq N$, where $d_{I,i}$: is the Hamming distance between the index of the fingerprint of multimedia object $V_i$ and the index of the fingerprint of the query multimedia object Z; and $d_{R,i}$: is the Hamming distance between the reminder of the fingerprint of multimedia object $V_i$ and the reminder of the fingerprint of the query multimedia object Z.

Further, a parameter $B_j$, $0 \leq j \leq I$ is defined to denote the number of $d_i$ satisfying $d_{I,i} = j$. In other words, $B_j$=number of $\{i | 1 \leq i \leq N, d_{I,i} = j\}$.

(It is noted that the notation within the brackets above means "all i between 1 and N such that $d_{I,i} = j$".) The fingerprint matching mechanism uses a threshold parameter $\tau$ as follows:

If $i = \arg_{j=1, 2, \ldots, N} \min d_j$ and $d_i \leq \tau$, the fingerprint matching mechanism decides that the multimedia object Z corresponds to the multimedia object $V_i$. If the minimum value of all N Hamming distances $d_i$ is attained by a fingerprint for more than one i, one of them is chosen randomly.

Else, the fingerprint matching mechanism decides that the multimedia object Z does not correspond to any of the N multimedia objects $V_N$.

It might happen that $$\min_{i=1,\ldots,N} d_j$$

is achieved by more than j. Thus, $A_{min}$ is denoted is used herein to denote the number of j for which $$\min_{i=1,\ldots,N} d_j$$

is achieved.

Remark: In the text above, we defined the parameter U as the number of all multimedia objects in the reference database and distinguished it from the parameter N defining the number of reference fingerprints against which a query fingerprint is queried. In section 4.0, we also defined the parameter D as the average of collisions per index. In general, the parameter U is a multiple of D from which we can see by (4.2) that the parameters D and U respectively differ by a constant factor from N.

5.2 Derivation of Probabilistic Formulas for $P_f$, $P_c$, $P_m$, and $P_d$

In order to derive the quantities $P_f$, $P_c$, $P_m$, and $P_d$, the following auxiliary notation is introduced. The multinomial coefficients are abbreviated as:

$$C_M^{a_1 \ldots a_h} := \binom{M}{a_1 \ldots a_h},$$

where $a_1 + \ldots a_h = M$. For k=2, this definition corresponds to the definition of the binomial coefficient used in section 4.0 in an obvious way. Further, the following are defined for $0 <= k <= L-I$:

$$f_0(k) = 2^{-L+I} C_{L-I}^k,$$

$$f_1(k) = C_{L-I}^k p^k (1-p)^{L-I-k}, \text{ and}$$

$$F_u(k) = \sum_{j=k}^{L-I} f_u(j) \text{ for } u = 1, 2.$$

5.2.1 Calculation of $P_f$

Probability $P_f$ can be computed from the following formulas:

$$P_f = P(\text{at least one of the } d_1, d_2, \ldots, d_N \leq \tau | H_0)$$
$$= 1 - P(\text{none one of the } d_1, d_2, \ldots, d_N \leq \tau | H_0)$$

$$= 1 - \prod_{m=1}^{N} G_0(\tau + 1 - d_{I,m}) \quad (5.3)$$

$$= 1 - \prod_{u=0}^{W} G_0^{DC_W^u}(\tau + 1 - u). \quad (5.4)$$

The calculation above uses the fact that under the hypothesis $H_0$ for any $i \in \{1, \ldots, N\}$, satisfying $d_{1,i} \leq j+1$ for a fixed j, $P(d_i > j) = F_0(j + 1 - d_{I,i})$.

And that for $d_{I,i} > j+1$, we have $P(d_i > j) = 1$ which can be summarized as, $$P(d_i > j) = G_0(j + 1 - d_{I,j}) =$$
$$\begin{cases} F_0(j+1-d_{I,i}), & \text{if } d_{I,i} \leq j+1 \text{ and } j+1-d_{I,i} \leq L-I, \\ 1, & \text{if } d_{I,i} > j+1. \\ 0 & \text{if } j+1-d_{I,i} > L-I \end{cases}$$

5.2.2 Calculation of $P_c$

It is noted that if the weak bit prediction is not correct, then the fingerprint in the multimedia fingerprint database that corresponds to the fingerprint of the query multimedia object will not be identified. In other words, the conditional probability is $$P_{c|W^c} = 0. \quad (5.5)$$

Thus, $$P_c = P_{c|W} P_W.$$

If the weak bit prediction is correct, then it can be assumed that a specific hypothesis $H_s$, $1 \leq s \leq N$ is correct; thus, the following needs to be calculated:

$$P_c = P_{c|W} P_W = \sum_{s=1}^{N} P_{c|H_s} P_{H_s} \quad (5.6)$$

The following calculations show that the value of $P_{c|H_s}$ depends indeed on the actual hypothesis $H_s$ and in particular depends on the quantity $d_{I,s}$. First, it can be seen that $$P_{c|H_s} = P(\text{deciding } s \mid H_s) \quad (5.7)$$
$$= P\left(d_s \leq \tau \wedge d_s < \min_{i \neq s} d_i \mid H_s\right) +$$
$$P\left(\min_{i \neq s} d_i = d_s \leq \tau \wedge s \text{ is decided} \mid H_s\right).$$

(It is noted that the notation "$\wedge$" used herein means "and".)
Then, the first probability on the right-hand side of (5.7) is calculated as follows:

$$P\left(d_s \leq \tau \wedge d_s < \min_{i \neq s} d_i \mid H_s\right) = \sum_{j=0}^{\tau} P\left(d_s = j \wedge j < \min_{i \neq s} d_i \mid H_s\right) \quad (5.8)$$
$$= \sum_{j=0}^{\tau} P(d_{R,s} = j - d_{I,s} \wedge j < \min_{i \neq s} d_i \mid H_s).$$

Under the condition $H_s$, the events $d_{R,s} = j - d_{I,s}$ and $$j < \min_{i \neq s} d_i$$

are independent, so $$P\left(d_{R,s} = j - d_{I,s} \wedge j < \min_{i \neq s} d_i \mid H_s\right) \quad (5.9)$$
$$= P(d_{R,s} = j - d_{I,s} \mid H_s) P\left(j < \min_{i \neq s} d_i \mid H_s\right).$$

Then, it is easy to see that $$P(d_{R,s} = j - d_{I,s} \mid H_s) = g_1(j - d_{I,s}), \quad (5.10)$$
where $$g_1(j - d_{I,s}) = \begin{pmatrix} f_1(j - d_{I,s}), & \text{if } j \geq d_{I,s} \text{ and } j - d_{I,s} < L - 1 \\ 0, & \text{else} \end{pmatrix} \quad (5.11)$$

Further, using the definition of $G_0(\ldots)$ as given after formula (5.4), $$P\left(j < \min_{i \neq s} d_i \mid H_s\right) = \prod_{m=1, m \neq s}^{N} G_0(j + 1 - d_{I,m}). \quad (5.12)$$

Similarly, the second probability on the right-hand side of (5.7) is calculated as follows:

$$P\left(\min_{i \neq s} d_i = d_s \leq \tau \wedge s \text{ is decided} \mid H_s\right) \quad (5.13)$$
$$= \sum_{k=1}^{N-1} P\left(\min_{i \neq s} d_i = d_s \leq \tau \wedge A_{min} = k + 1 \wedge s \text{ is decided} \mid H_s\right)$$
$$= \sum_{k=1}^{N-1} \frac{1}{k+1} P\left(\min_{i \neq s} d_i = d_s \leq \tau \wedge A_{min} = k + 1 \mid H_s\right)$$
$$= \sum_{k=1}^{N-1} \frac{1}{k+1} \sum_{j=0}^{\tau} P\left(d_{R,s} = j - d_{I,s} \wedge \min_{i \neq s} d_i = j \wedge A_{min} = k + 1 \mid H_s\right)$$

The last probability (5.13) can be written as:

$$P\left(d_{R,s} = j - d_{I,s} \wedge \min_{i \neq s} d_i = j \wedge A_{min} = k + 1 \mid H_s\right) \quad (5.14)$$
$$= \sum_{b_1=1}^{N} \cdots \sum_{\substack{b_k=1 \\ b_1 < \ldots < b_k, b_i \neq s \\ \text{numberof}\{b_i | d_{I,b_i} = d_{I,s}\} \leq B_{d_{I,s}} - 1}}^{N}$$
$$P\left(d_{R,s} = j - d_{I,s} \wedge \min_{i \neq s} d_i = j \text{ attained by } b_1, \ldots, b_k \mid H_s\right)$$

Arguing as in (5.9)-(5.12), the last probability in (5.14) can be expressed as:

$$P(d_{R,s} = j - d_{I,s} \wedge \min_{i=1,\ldots N} d_i = j \text{ attained by } s, b_1, \ldots, b_k \mid H_s) \quad (5.15)$$
$$= g_1(j - d_{I,s}) \prod_{i=1}^{k} g_0(j - d_{I,b_i}) \prod_{m=1, m \neq s, b_1, \ldots, b_k}^{N} G_0(j + 1 - d_m),$$

where $$g_0(j - d_{I,s}) = \begin{pmatrix} f_0(j - d_{I,s}), & \text{if } j \geq d_{I,s} \text{ and } j - d_{I,s} < L - 1 \\ 0, & \text{else} \end{pmatrix}$$

Combining (5.7)-(5.10) and (5.12)-(5.15) gives:

$$P_{c|H_s} = \sum_{j=0}^{\tau} g_1(j - d_{l,s}) \prod_{m=1, m \neq s}^{N} G_0(j+1-d_m)$$

$$+ \sum_{j=0}^{\tau} \sum_{k=1}^{N-1} \frac{1}{k+1} \sum_{b_1=1}^{N} \cdots \sum_{\substack{b_k=1 \\ b_1 < \ldots < b_k, b_i \neq s \\ \text{numberof}\{b_i | d_{l,b_i} = d_{l,s}\} \leq B_{d_{l,s}} - 1}}^{N}$$

$$\times g_1(j - d_{l,s}) \prod_{i=1}^{k} g_0(j - d_{l,b_i}) \prod_{m=1, m \neq s, b_1, \ldots, b_k}^{N} G_0(j+1-d_m)$$

$$= \sum_{j=0}^{\tau} g_1(j - d_{l,s}) G_0^{-1}(j+1-d_{l,s}) \prod_{u=0}^{W} G_0^{DC_W^u}(j+1-u)$$

$$+ \sum_{j=0}^{\tau} \sum_{k=1}^{N-1} \frac{1}{k+1} g_1(j - d_{l,s}) G_0^{-1}(j+1-d_{l,s}) \sum_{a_0=0}^{C_W^0 - \delta_{d_{l,s},0}} \cdots \sum_{\substack{a_W=0 \\ a_1 + \ldots a_W = k}}^{C_W^W - \delta_{d_{l,s},W}} C_W^{a_0, \ldots, a_W}$$

$$\times \prod_{i=0}^{W} g_0^{a_i}(j-i) \prod_{i=0}^{W} G_0^{DC_W^i - a_i}(j+1-i),$$

where $$\delta_{a,b} = \begin{cases} 1, & \text{if } a = b, \\ 0, & \text{else,} \end{cases}$$

Now, (5.16) can be inserted into (5.6) to obtain:

$$P_{c|W} = \sum_{v=0}^{W} \frac{C_W^v}{2^W} \sum_{j=0}^{\tau} g_1(j-v) G_0^{-1}(j+1-v) \prod_{u=0}^{W} G_0^{DC_W^u}(j+1-u) + \tag{5.17}$$

$$\sum_{v=0}^{W} \frac{C_W^v}{2^W} \sum_{j=0}^{\tau} \sum_{k=1}^{N-1} \frac{1}{k+1} g_1(j-v) G_0^{-1}(j+1-v)$$

$$\sum_{a_0=0}^{C_W^0 - \delta_{v,0}} \cdots \sum_{\substack{a_W=0 \\ a_1 + \ldots a_W = k}}^{C_W^W - \delta_{v,W}} C_W^{a_0, \ldots, a_W} \times$$

$$\prod_{i=0}^{W} g_0^{a_i}(j-i) \prod_{i=0}^{W} G_0^{DC_W^i - a_i}(j+1-i).$$

5.2.3 Calculation of $P_m$

It is noted that $$P_m = P_{m|W} P_W + P_{m|W^c} P_{W^c}. \tag{5.18}$$

First, $P_{m|W}$ is calculated. Similarly to the calculation of $P_{c|W}$, the conditional probability $P_{m|H_s}$ for a fixed s is considered.

$$P_{m|H_s} = P(\text{deciding } i \neq s \neq 0 \mid H_s) \tag{5.19}$$

$$= P\left(\min_{i \neq s} d_i \leq \tau \wedge \min_{i \neq s} d_i < d_s \mid H_s\right) +$$

$$P\left(\min_{i \neq s} d_i = d_s \leq \tau \wedge i \neq s \text{ is decided} \mid H_s\right)$$

The first probability on the right-hand side of (5.19) is transformed as follows:

$$P\left(\min_{i \neq s} d_i \leq \tau \wedge \min_{i \neq s} d_i < d_s \mid H_s\right) = \tag{5.20}$$

$$\sum_{j=0}^{\tau} \sum_{k=1}^{N-1} P\left(\min_{i \neq s} d_i = j \wedge j < d_s \wedge A_{min} = k+1 \mid H_s\right) =$$

$$\sum_{j=0}^{\tau} \sum_{k=1}^{N-1} \sum_{b_1=1}^{N} \cdots \sum_{\substack{b_k=1 \\ b_1 < \ldots < b_k, b_i \neq s \\ \text{numberof}\{b_i | d_{l,b_i} = d_{l,s}\} \leq B_{d_{l,s}} - 1}}^{N} P\Big(d_{R,s} >$$

$$j - d_{l,s} \wedge \min_{1 \leq i \leq N} d_i = j \text{ attained by } b_1 \ldots, b_k \mid H_s\Big)$$

Arguing as in (5.9)-(5.12), the last expression in (5.20) can be expressed as:

$$P\left(d_{R,s} > j - d_{l,s} \wedge \min_{i=1,\ldots,N} d_i = j \text{ attained by } b_1 \ldots, b_k \mid H_s\right) = \tag{5.21}$$

-continued $$G_1(j+1-d_{l,s})\sum_{i=1}^{k}g_0(j-b_i)\prod_{m=1,m\neq s,b_1,\ldots,b_k}^{N}G_0(j+1-d_m),$$

where $G_1(\ )$ is defined via $F_1(\ )$ in the same way $G_0(\ )$ is defined via $F_0(\ )$ in section 5.2.1. Then, the second probability in (5.19) is calculated as follows:

$$P\left(\min_{i\neq s}d_i=d_s\leq\tau\wedge i\neq s\text{ is decided}\mid H_s\right)= \quad (5.22)$$

$$\sum_{j=0}^{\tau}\sum_{k=1}^{N-1}\frac{k}{k+1}P(\min_{i\neq s}d_i=d_s=j\wedge A_{min}=k+1\mid H_s).$$

As can be seen, this probability has been calculated in (5.13)-(5.15).

Summarizing (5.19)-(5.22) gives:

$$P_{m|H_s}=\sum_{j=0}^{\tau}\sum_{k=1}^{N-1}\left(G_1(j+1-d_{l,s})+g_1(j-d_{l,s})\frac{k}{k+1}\right) \quad (5.23)$$

$$\sum_{b_1=1}^{N}\ldots\sum_{\substack{b_k=1\\b_1<\ldots<b_k,b_i\neq s\\\text{numberof}\{b_i|d_{l,b_i}=d_{l,s}\}\leq B_{d_{l,s}}-1}}^{N}\times$$

$$\prod_{i=1}^{k}g_0(j-I_{b_i})\prod_{m=1,m\neq s,b_1,\ldots,b_k}^{N}G_0(j+1-d_{l,m})=$$

$$\sum_{j=0}^{\tau}\sum_{k=1}^{N-1}\left(G_1(j+1-d_{l,s})+g_1(j-d_{l,s})\frac{k}{k+1}\right)$$

$$G_0^{-1}(j+1-d_{l,s})\times\sum_{a_0=0}^{C_W^0-\delta_{d_{l,s},0}}\ldots\sum_{\substack{a_W=0\\a_1+\ldots a_W=k}}^{C_W^W-\delta_{d_{l,s},W}}C_W^{a_0,\ldots,a_W}$$

$$\prod_{i=0}^{W}g_0^{a_i}(j-i)\prod_{i=0}^{W}G_0^{DC_W^i-a_i}(j+1-i).$$

Arguing as in (5.17), the following is obtained from (5.23):

$$P_{m|W}=\sum_{v=0}^{W}\frac{C_W^v}{2^W} \quad (5.24)$$

$$\sum_{j=0}^{\tau}\sum_{k=1}^{N-1}\left(G_1(j+1-v)+g_1(j-v)\frac{k}{k+1}\right)G_0^{-1}(j+1-v)\times$$

$$\sum_{a_0=0}^{C_W^0-\delta_{v,0}}\ldots\sum_{\substack{a_W=0\\a_1+\ldots a_W=k}}^{C_W^W-\delta_{v,W}}C_W^{a_0,\ldots,a_W}\prod_{i=0}^{W}g_0^{a_i}(j-i)$$

-continued $$\prod_{i=0}^{W}G_0^{DC_W^i-a_i}(j+1-i)$$

Now, the conditional probability $P_{m\backslash W^c}$ is calculated. The condition $W^c$ implies that the fingerprint of the query multimedia object does not correspond to any of the N indexed fingerprints as described in section 4.0. Thus, the hypothesis $H_0$ holds. The probability of the erroneous identification of the query fingerprint with any of the N fingerprints is therefore equal to the probability of a false positive, that is, $$P_{m\backslash W^c}=P_f. \quad (5.25)$$

5.2.4 Calculation of $P_d$

It is noted that $$P_d=P_{d\backslash W}P_W+P_{d\backslash W^c}P_{W^c} \quad (5.26)$$

First, the conditional probability $P_{d\backslash W}$ is calculated and, similarly to the calculation of $P_{c\backslash W}$ and $P_{m\backslash W}$, the quantity $P_{d\backslash H_s}$ is considered first:

$$P(d\mid H_s)=P\left(\min_{i=1,\ldots,N}d_i\leq\tau\mid H_s\right) \quad (5.27)$$

$$=1-\prod_{i=1}^{N}P(d_i\geq\tau+1\mid H_s)$$

$$=1-G_1(\tau+1-d_{l,s})\prod_{m=1,m\neq s}^{N}G_0(\tau+1-d_m).$$

Averaging as in (5.17), $P_{d\backslash W}$ is derived from (5.27) as follows:

$$P_{d|W}= \quad (5.28)$$

$$1-\sum_{v=0}^{W}\frac{C_W^v}{2^W}\sum_{j=0}^{\tau}G_1(j-v)G_0^{-1}(j+1-v)\prod_{u=0}^{W}G_0^{DC_W^u}(j+1-u).$$

The conditional probability $P_{d\backslash W^c}$ is considered next. From (3.1), (5.5), (5.25), and (5.26), it follows that $$P_{d\backslash W^c}=P_{m\backslash W^c}=P_f. \quad (5.29)$$

5.2.5 Alternative Derivation of $P_{d\backslash H_s}$

In this section, formula (3.1) is used to calculate $P_{d\backslash H_s}$ and to show that the result is identical to (5.27). Combining (5.16) and (5.23) gives $$P_{d|H_s}=P_{c|H_s}+P_{m|H_s} \quad (5.30)$$

$$=\sum_{j=0}^{\tau}g_1(j-d_{l,s})\prod_{m=1,m\neq s}^{N}G_0(j+1-d_m)+$$

$$\sum_{j=0}^{\tau}(G_1(j+1-d_{l,s})+g_1(j-d_{l,s}))$$

$$\sum_{k=1}^{N-1}\sum_{b_1=1}^{N}\ldots\sum_{\substack{b_k=1\\b_1<\ldots<b_k,b_i\neq s\\\text{numberof}\{b_i|d_{l,b_i}=d_{l,s}\}\leq B_{d_{l,s}}-1}}^{N}\times$$

-continued $$\prod_{i=1}^{k} g_0(j - I_{b_i}) \prod_{m=1, m \neq s, b_1, \ldots, b_k}^{N} G_0(j + 1 - d_{l,m})$$

$$= A_1 + A_2.$$

It is easy to see that $$A_2 = \sum_{j=0}^{\tau} G_1(j - d_{l,s}) \sum_{k=1}^{N-1} \sum_{b_1=1}^{N} \cdots \sum_{\substack{b_k=1 \\ b_1 < \ldots < b_k, b_i \neq s \\ \text{number of } \{b_i | d_{l,b_i} = d_{l,s}\} \leq B_{d_{l,s}}}}^{N} \times \quad (5.31)$$

$$\prod_{i=1}^{k} g_0(j - I_{l,b_i}) \prod_{m=1, m \neq s, b_1, \ldots, b_k}^{N} G_0(j + 1 - d_{l,m}).$$

Now, formula (5.30) is transformed as $$P_{c|H_s} + P_{m|H_s} = A_1 + A_2 + B - B, \quad (5.32)$$

where $$B = \sum_{j=0}^{\tau} G_1(j - d_{l,s}) \prod_{m=1, m \neq s}^{N} G_0(j + 1 - d_m).$$

Then, $$A_2 + B = \sum_{j=0}^{\tau} G_1(j - d_{l,s}) \prod_{m=1, m \neq s}^{N} (g_0(j - d_m) + G_0(j + 1 - d_m)) \quad (5.33)$$

$$= \sum_{j=0}^{\tau} G_1(j - d_{l,s}) \prod_{m=1, m \neq s}^{N} G_0(j - d_m).$$

Also, $$A_1 - B = -\sum_{j=0}^{\tau} G_1(j + 1 - d_{l,s}) \prod_{m=1, m \neq s}^{N} G_0(j + 1 - d_m). \quad (5.34)$$

Combining (5.33) and (5.34) gives:

$$A_1 + A_2 = G_1(-d_{l,s}) \prod_{m=1, m \neq s}^{N} G_0(-d_m) - G_1(\tau + 1 - d_{l,s}) \quad (5.35)$$

$$\prod_{m=1, m \neq s}^{N} G_0(\tau + 1 - d_m)$$

$$= 1 - G_1(\tau + 1 - d_{l,s}) \prod_{m=1, m \neq s}^{N} G_0(\tau + 1 - d_m),$$

which is identical to formula (5.27) as required.

6.0 Method for Dynamically Configuring Search Parameters for Multimedia Fingerprint Databases that Use Weak Bits This section describes example embodiments in which the model developed in section 5.0 is used to automatically determine, for hash-table based multimedia fingerprint databases that use weak bits, the optimal fingerprint length (or size), the optimal index length (or size), the optimal threshold value $\tau$, and the optimal number of weak bits.

6.1 Determining the Maximum Fingerprint Length $L_{max}$

In an example embodiment, the maximum fingerprint length $L_{max}$ is determined during an initialization step in which the operational parameters of a multimedia fingerprint database are determined. $L_{Max}$ is the maximal fingerprint length conceivable under any circumstances for the target operational context of the multimedia fingerprint database. In order to define $L_{max}$, the following three input parameters may need to be determined or otherwise selected:

Maximum database size for the envisioned operational context.

Maximum value of p for the envisioned operational context.

Lowest possible value of $P_W$ the envisioned operational context.

In addition, the following value ranges for configuration values for the database design and search may be needed:

Range of possible index length values I for the envisioned operational context.

Possible range for number of weak bits W.

Possible range of threshold values $\tau$

The values for the three input parameters above as well as the three range of values for the configuration values may be derived in various ways and may depend on various factors including, but not limited to, the particular operational context, the type of content that needs to be identified, and any additional knowledge of the users about the type of content-based identification that needs to be performed. In some cases, the values for the above parameters may be estimated based on heuristics and/or other information.

According to the techniques described herein, the input values for the three input parameters and a series of fixed values of L, I, W, and $\tau$ may be used to calculate a resulting series of values of $P_f$, $P_c$, $P_m$, and $P_d$ by using the formulas derived in section 5.0. By comparing the resulting series, the minimum value of L can be determined for which the values of $P_f$, $P_c$, $P_m$, and $P_d$ match best the envisioned target values for the particular operational context in which the underlying multimedia fingerprint database will be used. It is noted that increasing L further (e.g., beyond the optimal minimum value) may lead to even better sensitivity of the fingerprint matching mechanism but it would come at the cost of eventually deteriorating the robustness of the mechanism.

The value of L chosen or determined at this step is referred to herein as $L_{max}$, and it is the length (or size) that all fingerprints stored in the multimedia fingerprint database will have.

6.2 Storing Reference Fingerprints in the Multimedia Fingerprint Database

After determining $L_{max}$, the initialization step in an example embodiment may include extracting reference fingerprints from the multimedia objects that will be represented in the multimedia fingerprint database, and storing the extracted reference fingerprints in the multimedia fingerprint database.

For example, a reference fingerprint of length $L_{max}$ is extracted from each multimedia object that is represented in the multimedia fingerprint database. Then, the extracted reference fingerprint is stored in the multimedia fingerprint database in accordance with the techniques described herein. In this manner, all reference fingerprints stored in the multimedia fingerprint database have the same length of $L_{max}$.

6.3 Determining the Values of Parameters $L_{actual}$, $I_{actual}$, $\tau_{actual}$, and $W_{actual}$ In an example embodiment, after the multimedia fingerprint database is initialized and at least some reference fingerprints are stored therein, the multimedia fingerprint database is configured for searching by determining and setting the values of one or more search parameters such as for example, $L_{actual}$, $I_{actual}$, $\tau_{actual}$, and $W_{actual}$. These parameters are the parameters according to which the multimedia fingerprint database is designed and configured at a certain "actual" time. For example, $L_{actual}$ is the fingerprint size used at that certain time, $I_{actual}$ is the index size used at that certain time, $\tau_{actual}$ is the threshold value used at that time, and $W_{actual}$ is the number of weak bits used at that certain operational time. It is noted that in various on a scenarios the values of the four parameters $L_{actual}$, $I_{actual}$, $\tau_{actual}$, and $W_{actual}$ may be optimized in various ways including, but not limited to, together as a group, individually and separately from each other, in any combination subset of two or more, subsequently one after the other, sequentially, iteratively, or jointly.

The target probabilities $P_f$, $P_c$, $P_m$, and $P_d$ depend on the configuration parameters L, I, W, $\tau$ as well as on the following parameters describing the status of the fingerprinting system:

Actual database size U of the multimedia fingerprint database at time $t_1$ (in terms of the number of reference multimedia objects represented therein) at that particular time. We recall from the remark at then end of section 5.1 that a change of U leads to a proportional change of N which is used to calculate the target probabilities $P_f$, $P_c$, $P_m$, and $P_d$.

Actual value of p at time $t_1$.

Actual value of $P_W$ at time $t_1$.

Using the values of the above three parameters and a series of fixed values for one or more of L, I, W, and $\tau$, at time $t_i$ a resulting series of values of $P_f$, $P_c$, $P_m$, and $P_d$ may be calculated by using the formulas derived in section 5.0. By comparing the resulting series, those values of L, I, W, and $\tau$ can be determined for which the values of $P_f$, $P_c$, $P_m$, and $P_d$ match best the target values that are required from the underlying multimedia fingerprint database at time $t_1$. For the determination of the paramaters L, I, W, and $\tau$ one could for example first determine L by trying different values of L and different values of I, W, and $\tau$. Then, one could for the now fixed L determine consecutively, I, W, and $\tau$ in a similar manner. Alternatively, one could first determine W and then decide the other parameters subsequently. Or, one could determine all parameters jointly or subsequently determine subgroups of the four parameters described in the way above.

The value of L determined at any particular time (e.g., such as time $t_1$) is referred to herein as $L_{actual}$, and it is the length (or size) of those portions of the reference fingerprints that will be used for matching query fingerprints of query multimedia objects to reference fingerprints in the multimedia fingerprint database after that particular time (and until a next re-configuration of the $L_{actual}$ parameter is performed).

The value of I determined at any particular time (e.g., such as time $t_1$) is referred to herein as $I_{actual}$, and it is the length (or size) of those portions of the indexes, on the reference fingerprints, that will be used for matching indexes on query fingerprints extracted from query multimedia objects to the indexes on the reference fingerprints stored in the multimedia fingerprint database after that particular time (and until a next re-configuration of the $I_{actual}$ parameter is performed). According to the techniques described herein, the value of $I_{actual}$ needs to chosen smaller than the current value of $L_{actual}$. It is noted that the value of $L_{actual}$ does not necessarily need to be configured before the value of $I_{actual}$, but as mentioned above, the values of the four search parameters $L_{actual}$, $I_{actual}$, $\tau_{actual}$, and $W_{actual}$ can be configured in any suitable manner such as, for example, jointly (in any suitable combination), individually and separately of each other, iteratively, and/or consecutively.

The value of $\tau$ determined at any particular time (e.g., such as time $t_1$) is referred to herein as $\tau_{actual}$, and it is the threshold value that is used after the particular time (and until a next re-configuration of the $\tau_{actual}$ parameter is performed) to determine whether a query fingerprint (or an index thereon) matches a reference fingerprint (or an index thereon). Depending on the particular operational context in which a multimedia fingerprint database operates and/or on the relative importance in that context of each of the $L_{actual}$, $I_{actual}$, $\tau_{actual}$, and $W_{actual}$ parameters, the value of $\tau_{actual}$ can be configured with respect to the other three search parameters in any suitable manner such as, for example, jointly (in any suitable combination), individually and separately, iteratively, and/or consecutively.

The value of W determined at any particular time (e.g., such as time $t_1$) is referred to herein as $W_{actual}$, and it is the number of weak bits that is used after the particular time (and until a next re-configuration of the $W_{actual}$ parameter is performed) to determine whether a query fingerprint (or an index thereon) matches a reference fingerprint (or an index thereon). Depending on the particular operational context in which a multimedia fingerprint database operates and/or on the relative importance in that context of each of the $L_{actual}$, $I_{actual}$, $\tau_{actual}$ parameters, the value of $W_{actual}$ can be configured with respect to the other three search parameters in any suitable manner such as, for example, jointly (in any suitable combination), individually and separately, iteratively, and/or consecutively.

6.4 Fingerprint Matching Based on the Configured Search Parameters

In an example embodiment, a fingerprint matching mechanism is configured to match query fingerprints extracted from query multimedia objects to the reference fingerprints stored in the multimedia fingerprint database based on the current, actual values of one or more search parameters such as for example, $L_{actual}$, $I_{actual}$, $W_{actual}$, and $\tau_{actual}$.

According to the techniques described herein, the fingerprint matching algorithm is configured as follows. For each reference fingerprint in the multimedia fingerprint database, the fingerprint bits are divided in two sets of bits $S_1$ and $S_2$, where the set $S_1$ contains $L_{actual}$ number of bits and the set $S_2$ contains $L_{max} - L_{actual}$ number of bits. In various implementations and embodiments, the bits of a reference fingerprint may be assigned to each of sets $S_1$ and $S_2$ in any suitable manner. It is noted that the techniques described herein are not limited to any particular manner of assigning bits to sets $S_1$ and $S_2$, except that the techniques described herein require that the same deterministic procedure to assign the bits to sets $S_1$ and $S_2$ is applied to all fingerprints in the following sense:

the fingerprint extraction logic extracts $L_{max}$ bits from a multimedia objects in a deterministic way and the extracted bits can be indexed as $b_1 < \ldots b_{L_{max}}$;

a subset of the fingerprint index values $1, \ldots, L_{max}$ of magnitude $L_{actual}$ is chosen and the corresponding bits are assigned to set $S_1$;

the remaining $L_{max} - L_{actual}$ bits are assigned to set $S_2$.

In operation, only the portion of a reference fingerprint assigned in set $S_1$ is used for matching. The value of $\tau$ used by the fingerprint matching mechanism is set to the currently configured value $\tau_{actual}$. Whenever the fingerprint matching mechanism queries a query multimedia object against the multimedia fingerprint database, only the $L_{actual}$ bits corresponding to set $S_1$ are extracted from the query multimedia object and matched against the $L_{actual}$ reference fingerprints belonging to set $S_1$ stored in the multimedia fingerprint database for each reference fingerprint. If the fingerprint extraction logic is built in a way that the extraction of certain fingerprint bits requires the previous extraction of other fingerprint bits, then more than $L_{actual}$ bits might be extracted from the query multimedia object, but only the $L_{actual} \in S_1$ bits are used by the fingerprint matching mechanism to query the multimedia fingerprint database. It is noted, however, that in practice such a scenario is unlikely to occur because it is desirable to design fingerprints such that the information represented in different bits is not correlated. Thus, in practice, bits that are more important are going to be assigned, according to a measure relevant to the particular operational context, to set $S_1$ and the remaining bits are going to be assigned to set $S_2$.

6.5 Dynamically Configuring the Search Parameters for a Multimedia Fingerprint Database that Uses Weak Bits According to the techniques described herein, the search parameters, which affect and govern how query fingerprints are searched against a multimedia fingerprint database, are dynamically re-configured at various points in time in order to provide for more optimal use of computing resources during the fingerprint matching operations and to reflect the current accuracy and robustness requirements for the multimedia fingerprint database as indicated by the required target values for the probabilities $P_f$, $P_c$, $P_m$, and $P_d$.

In an example embodiment, as the size of the multimedia fingerprint database changes, the techniques described in subsection 6.3 are used the recalculate the appropriate current fingerprint length $L_{actual}$ and the values of $\tau_{actual}$, $I_{actual}$, and $W_{actual}$. The recalculation might be done because one or several of the following reasons:

A) Some of the target probabilities have changed.
B) The parameter p has changed
C) The parameter $P_w$ has changed
D) The parameter U has changed Regarding point D), we recall from the remark at then end of section 5.1 that a change of U leads to a proportional change of N which is used to calculate the target probabilities $P_f$, $P_c$, $P_m$, and $P_d$.

In reaction to one or several of the reasons A)-D), one or more of the four parameters $L_{actual}$, $\tau_{actual}$, $I_{actual}$, and $W_{actual}$ might be changed using the method defined in section 6.3. In particular, the value of $L_{actual}$ might be changed. In this case, for each reference fingerprint bits might have to be shifted from $S_1$ to set $S_2$ or vice-versa depending if the value of $L_{actual}$ decreases or increases. As a result of the decrease of the size of $L_{actual}$ certain bits might be moved from set $S_1$ to set $S_2$ that belonged to the index with size $I_{actual}$ before $L_{actual}$ was changed. This might require that the index size is decreased or that bits which were previously not part of the index are now included in the index. In addition, the index size might change using the procedure described in subsection 6.3. Similarly, the number of weak bits might be reduced as a result of a reduction of $L_{actual}$ if some of the bits moved from $S_1$ to set $S_2$ were classified as weak bits $L_{actual}$ was decreased.

Figure 2:
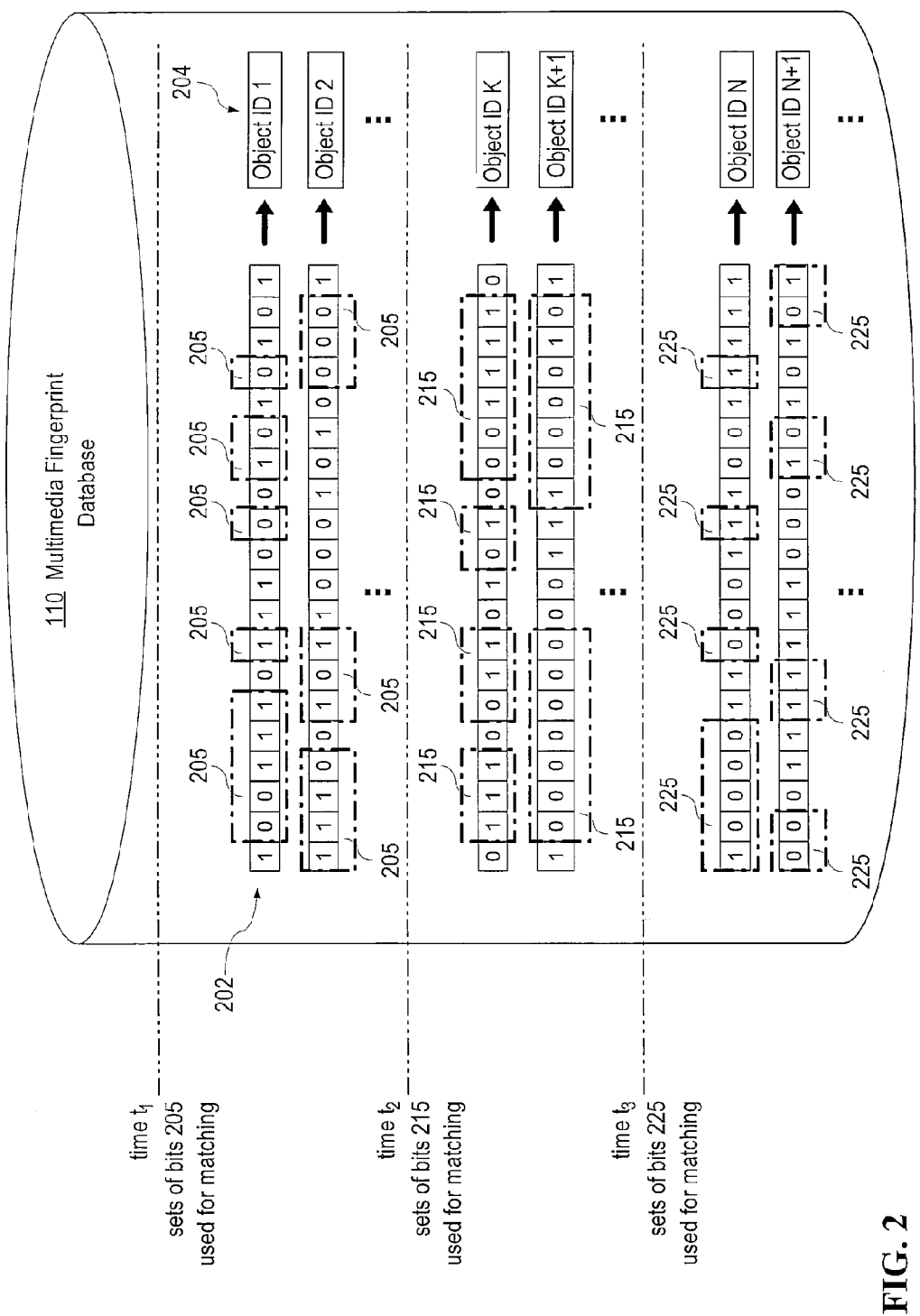
FIG. 2 is a block diagram that illustrates the storage and usage of reference fingerprints in a multimedia fingerprint database according to an example embodiment.

FIG. 2 is a block diagram that illustrates the storage and usage of reference fingerprints in a multimedia fingerprint database according to an example embodiment of the techniques described herein.

Multimedia fingerprint database 110 is initialized and configured to store reference fingerprints 202 and metadata information 204 that identifies the reference multimedia objects that are represented by reference fingerprints 202. For example, at initialization time, the value of $L_{max}$ for multimedia fingerprint database 110 is determined according to the techniques described herein and is set to $L_{max}=20$. Then, a reference fingerprint having length of 20 bits is extracted from each reference multimedia object that is available at the initialization time, and the extracted reference fingerprint is stored in multimedia fingerprint database 110 in association with metadata information that identifies the reference multimedia object. Thus, all of the reference fingerprints 202 stored in multimedia fingerprint database 110 have the same length of 20 bits.

At time $t_1$ (which may be the initialization time or a time point thereafter), the techniques described herein are used to determine the current values for the search parameters (e.g., $L_{actual}$, $I_{actual}$, $W_{actual}$, and $\tau_{actual}$) that will be used after time $t_1$ to match query fingerprints extracted from query multimedia objects to reference fingerprints 202. For example, a series of values for one or more of the probabilities $P_f$, $P_c$, $P_m$, and $P_d$ are calculated by using the formulas derived in section 5.0 based on a series of values for one or more of L, I, W, and $\tau$. By comparing the computed series of values for $P_f$, $P_c$, $P_m$, and $P_d$, those values of L, I, W, and $\tau$ are determined for which the values of $P_f$, $P_c$, $P_m$, and $P_d$ match best the target values that are required from the multimedia fingerprint database 110 at time $t_1$. As illustrated in FIG. 2, the value determined for $L_{actual}$ is 10 bits ($L_{actual}=10$), and this value is used after time $t_1$ to match query fingerprints against reference fingerprints 202. Specifically, in accordance with the techniques described herein, 10 bits from each reference fingerprint are determined (or otherwise selected) and assigned to the set of bits $S_1$ (set of bits 205 in FIG. 2) that is associated with that reference fingerprint. Thereafter the sets of bits 205, which include the $S_1$ sets of all reference fingerprints 202, is used by a fingerprint matching mechanism to match query fingerprints extracted from query multimedia objects to reference fingerprints 202.

At time $t_2$ (which is after time $t_1$), some operational characteristics of multimedia fingerprint database 110 have changed. For example, the size of multimedia fingerprint database 110 may have been increased to store reference fingerprints for additional reference multimedia objects. In another example, a set of new target values for one or more of the probabilities $P_f$, $P_c$, $P_m$, and $P_d$ may have been received from a user (e.g., such as a system administrator). As a result, the current values for the search parameters (e.g., $L_{actual}$, $I_{actual}$, $W_{actual}$, and $\tau_{actual}$) need to be reconfigured. Thus, at time $t_2$, the techniques described herein are used to determine new current values for the search parameters (e.g., $L_{actual}$, $I_{actual}$, $W_{actual}$, and $\tau_{actual}$) that will be used after time $t_2$ to match query fingerprints extracted from query multimedia objects to reference fingerprints 202. For example, a series of values for one or more of the probabilities $P_f$, $P_c$, $P_m$, and $P_d$ are calculated by using the formulas derived in section 5.0 based on a series of values of L, I, W, and $\tau$. By comparing the computed series of values for $P_f$, $P_c$, $P_m$, and $P_d$, those values of L, I, W, and $\tau$ are determined for which the values of $P_f$, $P_c$, $P_m$, and $P_d$ match best the target values that are required from the multimedia fingerprint database 110 at time $t_2$. As illustrated in FIG. 2, the value determined for $L_{actual}$ is 14 bits ($L_{actual}=14$), and this value is used after time $t_2$ to match query fingerprints against reference fingerprints 202. Specifically, in accordance with the techniques described herein, 14 bits from each reference fingerprint are determined (or otherwise selected) and assigned to the set of bits $S_1$ (set of bits 215) that is associated with that reference fingerprint. Thereafter the sets of bits 215, which include the $S_1$ sets of all reference fingerprints 202, is used by a fingerprint matching mechanism to match query fingerprints extracted from query multimedia objects to reference fingerprints 202.

At time $t_3$ (which is after time $t_2$), some operational characteristics of multimedia fingerprint database 110 have changed yet again. For example, the size of multimedia fingerprint database 110 may have been decreased by removing some reference fingerprints so that now the multimedia fingerprint database can be used to identify fewer multimedia objects. In another example, a set of new target values for one or more of the probabilities $P_f$, $P_c$, $P_m$, and $P_d$ may have been received from a user (e.g., such as a system administrator). As a result, the current values for the search parameters (e.g., $L_{actual}$, $I_{actual}$, $W_{actual}$, and $\tau_{actual}$) need to be reconfigured. Thus, at time $t_3$, the techniques described herein are used to determine new current values for the search parameters (e.g., $L_{actual}$, $I_{actual}$, $W_{actual}$, and $\tau_{actual}$) that will be used after time $t_3$ to match query fingerprints extracted from query multimedia objects to reference fingerprints 202. For example, a series of values for one or more of the probabilities $P_f$, $P_c$, $P_m$, and $P_d$ are calculated by using the formulas derived in section 5.0 based on a series of values of L, I, W, and $\tau$. By comparing the computed series of values for $P_f$, $P_c$, $P_m$, and $P_d$, those values of L, I, W, and $\tau$ are determined for which the values of $P_f$, $P_c$, $P_m$, and $P_d$ match best the target values that are required from the multimedia fingerprint database 110 at time $t_3$. As illustrated in FIG. 2, the value determined for $L_{actual}$ is 8 bits ($L_{actual}$=8), and this value is used after time $t_3$ to match query fingerprints against reference fingerprints 202. Specifically, in accordance with the techniques described herein, 8 bits from each reference fingerprint are determined (or otherwise selected) and assigned to the set of bits $S_1$ (set of bits 225) that is associated with that reference fingerprint. Thereafter the sets of bits 225, which include the $S_1$ sets of all reference fingerprints 202, is used by a fingerprint matching mechanism to match query fingerprints extracted from query multimedia objects to reference fingerprints 202.

In this manner, the techniques described herein may be used at any given point in time to reconfigure one or more of the search parameters of a multimedia fingerprint database so that the reconfigured search parameters can better reflect the current operational characteristics of the multimedia fingerprint database and can allow for the optimal use of computing resources during the process of identifying query multimedia objects against the database.

Figure 3A:
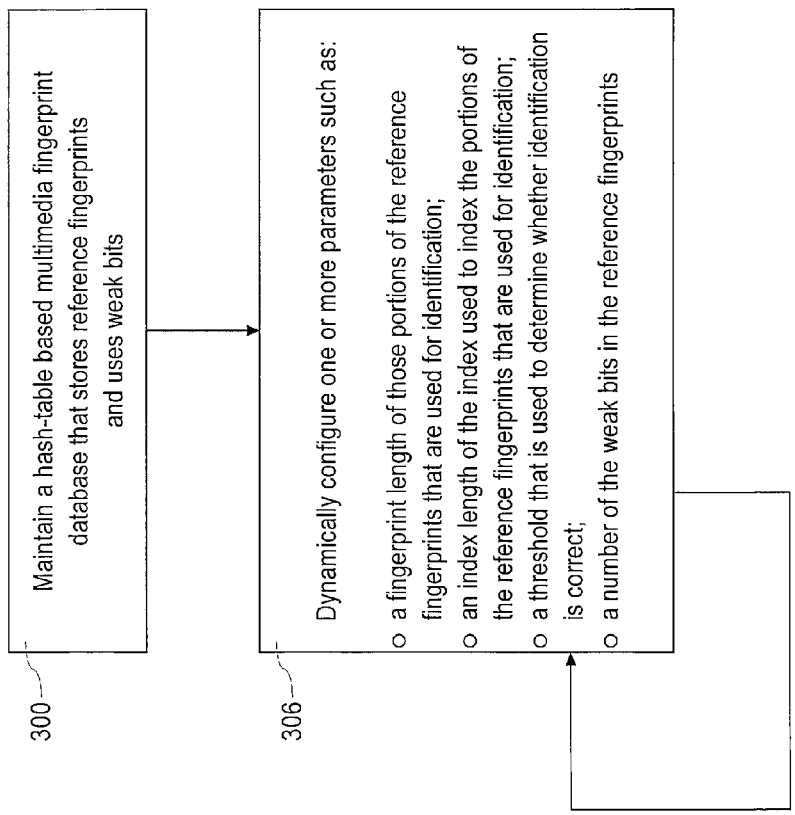
FIGS. 3A and 3B are flow diagrams that illustrate a method for dynamically configuring search parameters for a multimedia fingerprint database according to an example embodiment.
Figure 3B:
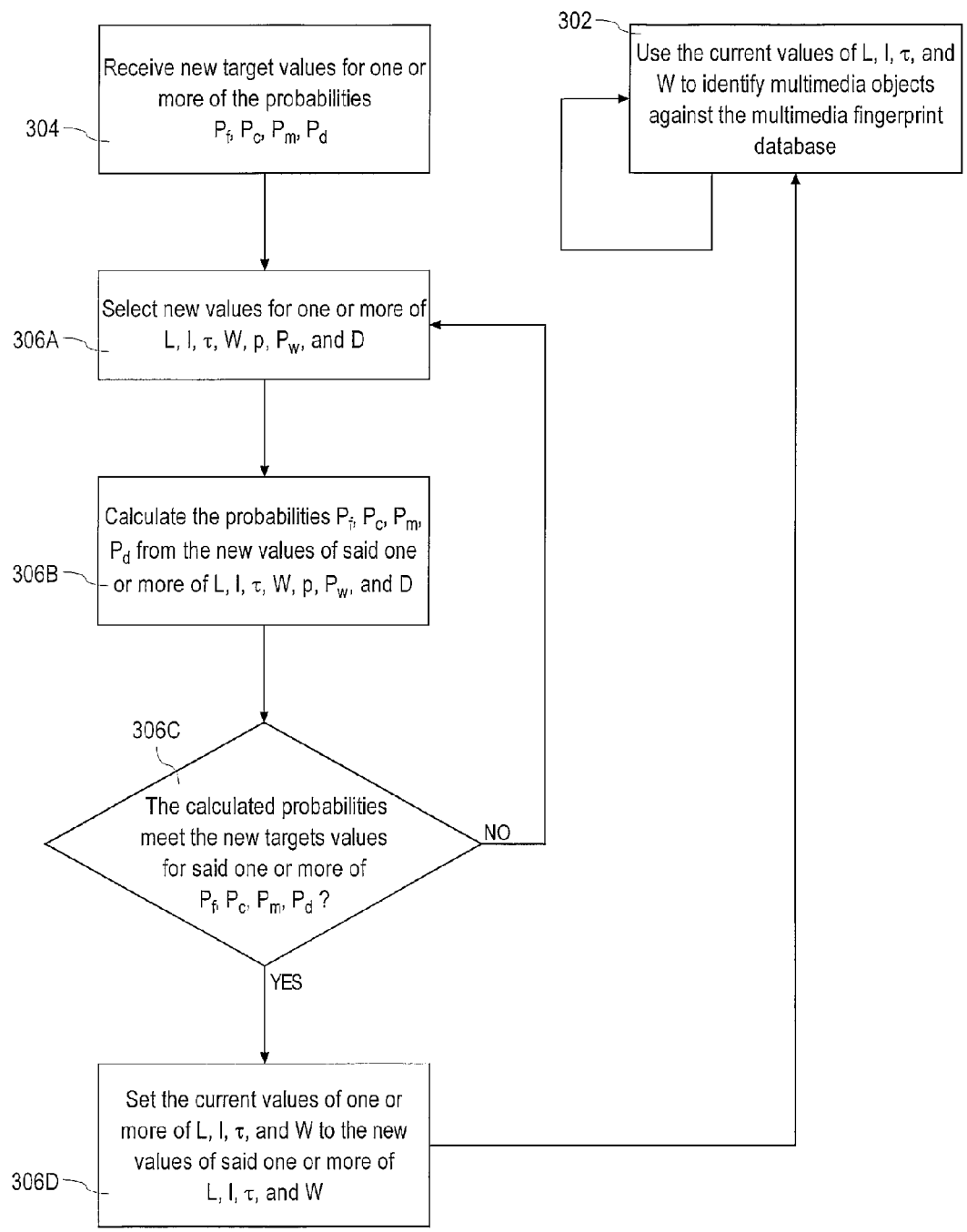

6.6 Example Method of Dynamically Configuring the Search Parameters for a Multimedia Fingerprint Database that Uses Weak Bits FIGS. 3A and 3B are flow diagrams that illustrate a method for dynamically configuring search parameters for a multimedia fingerprint database according to an example embodiment of the techniques described herein. The example method of FIGS. 3A and 3B may be implemented by a variety of components and in a variety of operational contexts. For example, in one operational context, the steps of the method in FIGS. 3A and 3B may be performed by components (e.g., such as dynamic configuration logic 104, fingerprint generator 106, and/or matching logic 108 illustrated in FIG. 1) that are executed by one or more computing devices.

Referring to FIG. 3A, in step 300 a multimedia fingerprint database that uses weak bits is initialized and maintained thereafter. For example, the multimedia fingerprint database is initialized and configured to store reference fingerprints and metadata information that identifies the reference multimedia objects that are represented by the reference fingerprints. At initialization time, the value of $L_{max}$ for the multimedia fingerprint database is determined as described in subsection 6.1. Then, as described in subsection 6.2, a reference fingerprint having length of $L_{max}$ bits is extracted from each reference multimedia object that is available at the initialization time or that is added to the multimedia fingerprint database thereafter. The extracted reference fingerprint is stored in the multimedia fingerprint database in association with metadata information that identifies the reference multimedia object. Thus, all of the reference fingerprints stored in the multimedia fingerprint database have the same length of $L_{max}$.

In step 306, one or more search parameters for the multimedia fingerprint database are automatically determined (as described in subsection 6.3) and are dynamically configured (as described in subsection 6.5). The one or more search parameters may include: a fingerprint length $L_{actual}$ of those portions of the reference fingerprints that are used for matching query fingerprints of multimedia query objects; an index length $I_{actual}$ of those portions of fingerprint indexes, on the reference fingerprints, that are used for matching the indexes on the reference fingerprints to indexes on the query fingerprints of multimedia query objects; a threshold $\tau_{actual}$ that is used to determine whether the identification of the query multimedia objects is correct; and the number of weak bits $W_{actual}$ in the reference fingerprints. Further details and the steps included in step 306 (e.g., such as steps 306A, 306B, 306C, and 306D) are described hereinafter with respect to FIG. 3B. It is noted that step 306 is performed periodically as the operational characteristics of the multimedia fingerprint may change with time.

Referring now to FIG. 3B, step 302 is performed by a fingerprint matching mechanism to identify query multimedia objects against the multimedia reference database as described in subsection 6.4. In step 302, the current values of the search parameters (e.g., $L_{actual}$, $I_{actual}$, $\tau_{actual}$, and/or the number of weak bits $W_{actual}$) are used to identify query multimedia objects against the multimedia fingerprint database. For example, in accordance with the techniques described herein, a set of bits $S_1$ containing $L_{actual}$ bits is determined (or is otherwise selected) from each reference fingerprint. Thereafter the sets of bits $S_1$, which are determined for the reference fingerprints stored in the multimedia reference database, are used by a fingerprint matching mechanism to match query fingerprints of length $L_{actual}$ extracted from query multimedia objects to the reference fingerprints. The fingerprint matching mechanism uses the currently configured value of $\tau_{actual}$ as a threshold to determine whether a match is found, it uses the current index length $I_{actual}$, and it uses the currently configured value of $W_{actual}$ as the number of weak bits.

At different points in time after the multimedia fingerprint database is initialized, the operational characteristics of the multimedia fingerprint database may change. For example, in step 304 a set of new target values for one or more of the probabilities $P_f$, $P_c$, $P_m$, and $P_d$ may be received from a user (e.g., such as a system administrator). In another example, the number of reference fingerprints stored in the multimedia fingerprint database may be increased or decreased.

As a practical example, consider a fingerprint-based content identification system that needs to verify whether user-uploaded video clips are not in violation of copyright laws. Initially, the multimedia fingerprint database used in such system may be configured to have the target probabilities of $P_f$=0.01 and $P_d$=0.01, and the length of the reference fingerprints stored in the multimedia fingerprint database may be determined as 25 ($L_{max}$=25). So at some point in time the multimedia fingerprint database may store U=1,000 reference fingerprints, and for this value of U it may have been determined that $L_{actual}$=10 bits is sufficient to meet the target values for $P_f$ and $P_d$. However, at a certain point in time thereafter, the number of reference fingerprints stored in the multimedia fingerprint database may go up to 2,000 (U=2, 000). When this happens, $L_{actual}$=10 may in fact not be appropriate to achieve the target probabilities for $P_f$ and $P_d$. In this case, the techniques described herein may be used to automatically determine and dynamically reconfigure a new value $L_{actual}$ (and/or new values for one or more of $I_{actual}$, $W_{actual}$, and $\tau_{actual}$, if necessary) so that the target values for $P_f$ and $P_d$ are satisfied.

In another practical example, suppose that at some point the fingerprint-based content identification system needs to use different values for the probabilities $P_f$ and $P_d$. For example, a system administrator may determine that in order to handle a larger volume of searches, the new target value of the probabilities $P_f$ and $P_d$ need to be set to 0.10, that is, $P_f$=0.10 and $P_d$=0.10. The system administrator inputs those new probabilities into the system, and the system uses the techniques described herein to automatically determine and dynamically reconfigure a new value $L_{actual}$ (and/or new values for one or more of $I_{actual}$, $W_{actual}$ and $\tau_{actual}$, if necessary) so that the new target values for $P_f$ and $P_d$ are satisfied. It is noted that new target values for any one of, or any combination of, the probabilities $P_f$, $P_c$, $P_m$, and $P_d$ may be set in a similar manner depending on the particular operational context. For example, in some operational contexts it may be important that false positive identifications are as low as possible because of the costs associated when an identification is detected (e.g., if a user-uploaded video is tagged as including copyrighted content, the user must be sent a letter and a business manager must spend time to follow up with the user). So in these operational contexts, the probability of false positive $P_f$ may need to be set very low and may need to be periodically adjusted as necessary. In another example, in some operational contexts it may be very important to correctly identify multimedia objects. So in these operational contexts, the probability of correct identification $P_c$ may have to be set very high and/or the probability of misclassification $P_m$ may have to be set very low, and these two probabilities may have to be adjusted periodically.

Referring to FIG. 3B, in response to a request to reconfigure the search parameters of the multimedia reference database and/or in response to receiving new target values for one or more of the probabilities $P_f$, $P_c$, $P_m$, and $P_d$ as indicated in step 304, a new set of current values for one or more of the search parameters (e.g., $L_{actual}$, $I_{actual}$, $\tau_{actual}$, and/or $W_{actual}$) may be automatically determined and dynamically configured, as indicated in steps 306A, 306B, 306C, and 306D.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
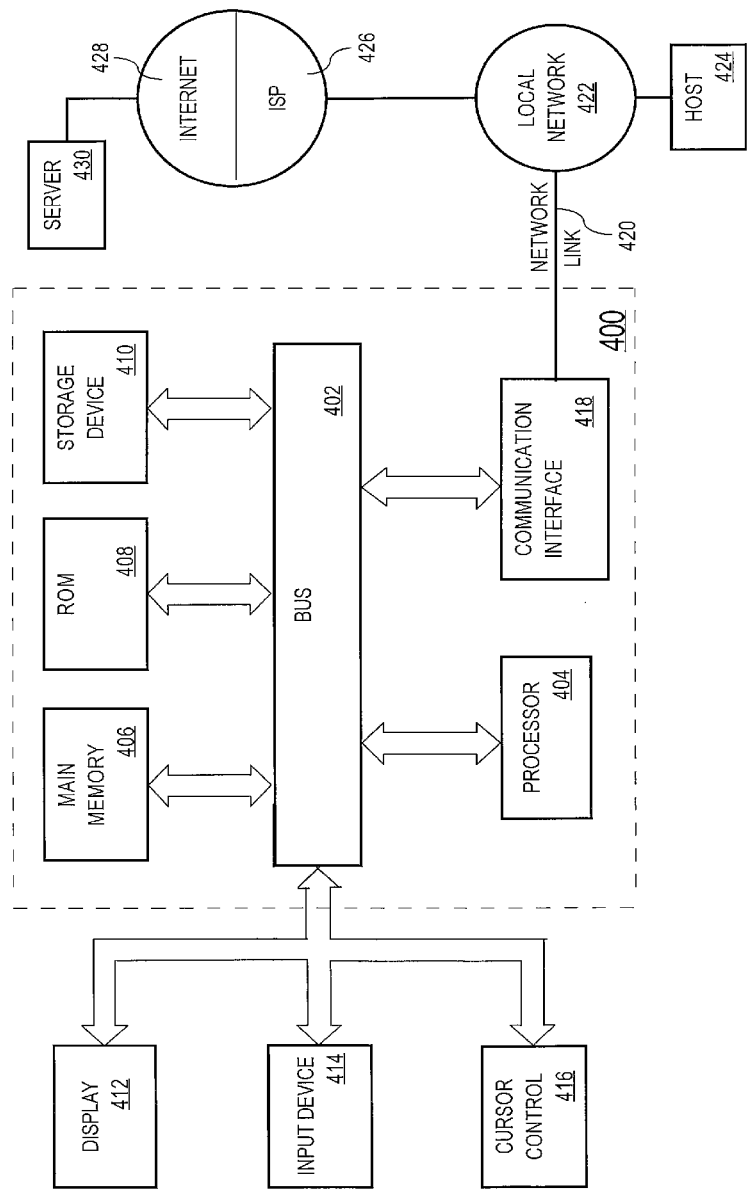
FIG. 4 is a block diagram that illustrates an example computer system on which embodiments may be implemented.

For example, FIG. 4 is a block diagram that illustrates a computer system 400 upon which an embodiment of the techniques described herein may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein may relate to any media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising the steps of:
maintaining a multimedia fingerprint database that stores reference fingerprints in one or more storage devices, wherein each of the reference fingerprints comprises up to a maximum fingerprint length of fingerprint bits;
wherein maintaining the multimedia fingerprint database comprises dynamically configuring one or more of search parameters for searching the multimedia fingerprint database, the search parameters comprising:
a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;
an index length, wherein the index length is not greater than the fingerprint length and represents a number of second fingerprint bits, in each of the reference fingerprints, that are used for indexing the reference fingerprints in the multimedia fingerprint database; or
a threshold, wherein the threshold is to be used for determining whether a query multimedia object from which the query fingerprint is derived is identified with a reference multimedia object from which a reference fingerprint in the multimedia fingerprints is derived;
wherein one or more of the fingerprint length, the index length, or the threshold are assigned one or more different values at a first time from one or more values assigned to the one or more of the fingerprint length, the index length, or the threshold at a second different time;
wherein the dynamic configuration step comprises the steps of:
automatically determining and assigning values to one or more of the fingerprint length, the index length, or the threshold;
subsequently using the values of the one or more of the fingerprint index length, or the threshold to determine matches between one or more query fingerprints derived from one or more query multimedia objects and the reference fingerprints in the multimedia fingerprint databases;
wherein the method is performed by one or more computing devices.

2. The method as recited in claim 1, wherein maintaining the multimedia fingerprint database further comprises using a set of formulas, which are based on one or more parameters, to compute one or more probabilities associated with identifying the one or more query multimedia objects.

3. The method as recited in claim 2, wherein the one or more probabilities comprise one or more of:
a probability of false positive;
a probability of correct identification;
a probability of misclassification; or
a probability of detection.

4. The method as recited in claim 1, wherein dynamically configuring further comprises using as input values one or more of:

a probability that an individual bit, which does not belong to a fingerprint index of a reference fingerprint stored in the multimedia fingerprint database, changes when a reference object represented by the reference fingerprint is modified; or a number of reference fingerprints stored in the multimedia fingerprint database.

5. The method as recited in claim 1, further comprising:
receiving a query multimedia object;
deriving a fingerprint from a query multimedia object; and
attempting to identify the query multimedia object by comparing the fingerprint to the reference fingerprints in the multimedia fingerprint database.

6. The method as recited in claim 1, wherein the maintaining step comprises the steps of:
receiving one or more target values respectively for one or more of a probability of false positive, a probability of correct identification, a probability of misclassification, and a probability of detection;
wherein dynamically configuring the multimedia fingerprint database further comprises determining and setting values for one or more of the fingerprint length, the index length, or the threshold, which cause the one or more target values to be met.

7. The method as recited in claim 1, further comprising:
computing a multiplication over a plurality of probabilities that describe a likelihood that a query fingerprint is wrongly identified with a specific reference fingerprint.

8. The method as recited in claim 1, further comprising:
computing a summation of a plurality of probabilities that correspond to a detection; or
computing a probability of detection as a function of both a probability of correct classification and a probability of misclassification.

9. A non-transitory computer-readable storage media that comprises a set of instructions stored therewith which, when executed by one or more computing or processing devices, causes performance of a process, the process comprising the steps of:
maintaining a multimedia fingerprint database that stores reference fingerprints in one or more storage devices, wherein each of the reference fingerprints comprises up to a maximum fingerprint length of fingerprint bits;
wherein maintaining the multimedia fingerprint database comprises dynamically configuring one or more of search parameters for searching the multimedia fingerprint database, the search parameters comprising:
a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;
an index length, wherein the index length is not greater than the fingerprint length and represents a number of second fingerprint bits, in each of the reference fingerprints, that are used for indexing the reference fingerprints in the multimedia fingerprint database; or
a threshold, wherein the threshold is to be used for determining whether a query multimedia object from which the query fingerprint is derived is identified with a reference multimedia object from which a reference fingerprint in the multimedia fingerprints is derived;
wherein one or more of the fingerprint length, the index length, or the threshold are assigned one or more different values at a first time from one or more values assigned to the one or more of the fingerprint length, the index length, or the threshold at a second different time;
wherein the dynamic configuration step comprises the steps of:
automatically determining and assigning values to one or more of the fingerprint length, the index length, or the threshold;
subsequently using the values of the one or more of the fingerprint index length, or the threshold to determine matches between one or more query fingerprints derived from one or more query multimedia objects and the reference fingerprints in the multimedia fingerprint databases.

10. A system, comprising:
means for maintaining a multimedia fingerprint database that stores reference fingerprints in one or more storage devices, wherein each of the reference fingerprints comprises up to a maximum fingerprint length of fingerprint bits;
wherein means for maintaining the multimedia fingerprint database comprises means for dynamically configuring one or more of search parameters for searching the multimedia fingerprint database, the search parameters comprising:
a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;
an index length, wherein the index length is not greater than the fingerprint length and represents a number of second fingerprint bits, in each of the reference fingerprints, that are used for indexing the reference fingerprints in the multimedia fingerprint database; or
a threshold, wherein the threshold is to be used for determining whether a query multimedia object from which the query fingerprint is derived is identified with a reference multimedia object from which a reference fingerprint in the multimedia fingerprints is derived;
wherein one or more of the fingerprint length, the index length, or the threshold are assigned one or more different values at a first time from one or more values assigned to the one or more of the fingerprint length, the index length, or the threshold at a second different time;
wherein the dynamic configuration mean comprises:
means for automatically determining and assigning values to one or more of the fingerprint length, the index length, or the threshold;
means for subsequently using the values of the one or more of the fingerprint length, the index length, or the threshold to determine matches between one or more query fingerprints derived from one or more query multimedia objects and the reference fingerprints in the multimedia fingerprint databases.

11. An apparatus comprising:
one or more processors; and
one or more non-transitory storage media, comprising a set of instructions stored therewith which, when executed by the one or more processors, causes performance of a process, the process comprising the steps of:
maintaining a multimedia fingerprint database that stores reference fingerprints in one or more storage devices, wherein each of the reference fingerprints comprises up to a maximum fingerprint length of fingerprint bits;

wherein maintaining the multimedia fingerprint database comprises dynamically configuring one or more of search parameters for searching the multimedia fingerprint database, the search parameters comprising:
  a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;
  an index length, wherein the index length is not greater than the fingerprint length and represents a number of second fingerprint bits, in each of the reference fingerprints, that are used for indexing the reference fingerprints in the multimedia fingerprint database; or
  a threshold, wherein the threshold is to be used for determining whether a query multimedia object from which the query fingerprint is derived is identified with a reference multimedia object from which a reference fingerprint in the multimedia fingerprints is derived;
wherein one or more of the fingerprint length, the index length, or the threshold are assigned one or more different values at a first time from one or more values assigned to the one or more of the fingerprint length, the index length, or the threshold at a second different time;
wherein the dynamic configuration step comprises the steps of:
  automatically determining and assigning values to one or more of the fingerprint length, the index length, or the threshold;
  subsequently using the values of the one or more of the fingerprint length, the index length, or the threshold to determine matches between one or more query fingerprints derived from one or more query multimedia objects and the reference fingerprints in the multimedia fingerprint databases.

12. A method, comprising the steps of:
maintaining a multimedia fingerprint database that stores reference fingerprints in one or more storage devices, wherein each of the reference fingerprints comprises up to a maximum fingerprint length of fingerprint bits;
wherein maintaining the multimedia fingerprint database comprises dynamically configuring one or more of search parameters for searching the multimedia fingerprint database, the search parameters comprising:
  a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;
  an index length, wherein the index length is not greater than the fingerprint length and represents a number of second fingerprint bits, in each of the reference fingerprints, that are used for indexing the reference fingerprints in the multimedia fingerprint database;
  a threshold, wherein the threshold is to be used for determining whether a query multimedia object from which the query fingerprint is derived is identified with a reference multimedia object from which a reference fingerprint in the multimedia fingerprints is derived; or
  a number of weak bits in the second fingerprint bits in each of the reference fingerprints, wherein a weak bit in the second fingerprint bits has a higher probability to change than a non-weak bit in the second fingerprint bits when a multimedia object, from which the second fingerprint bits are derived, is modified;
wherein one or more of the fingerprint length, the index length, the threshold, or the number of the weak bits are assigned one or more different values at a first time from one or more values assigned to the one or more of the fingerprint length, the index length, the threshold or the number of the weak bits at a second different time;
wherein the dynamic configuration step comprises the steps of:
  automatically determining and assigning values to one or more of the fingerprint length, the index length, the threshold or the number of the weak bits;
  subsequently using the values of the one or more of the fingerprint index length, the threshold, or the number of the weak bits to determine matches between one or more query fingerprints derived from one or more query multimedia objects and the reference fingerprints in the multimedia fingerprint databases;
wherein the method is performed by one or more computing devices.

13. A non-transitory computer-readable storage media that comprises a set of instructions stored therewith which, when executed by one or more computing or processing devices, causes performance of a process, the process comprising the steps of:
maintaining a multimedia fingerprint database that stores reference fingerprints in one or more storage devices, wherein each of the reference fingerprints comprises up to a maximum fingerprint length of fingerprint bits;
wherein maintaining the multimedia fingerprint database comprises dynamically configuring one or more of search parameters for searching the multimedia fingerprint database, the search parameters comprising:
  a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;
  an index length, wherein the index length is not greater than the fingerprint length and represents a number of second fingerprint bits, in each of the reference fingerprints, that are used for indexing the reference fingerprints in the multimedia fingerprint database;
  a threshold, wherein the threshold is to be used for determining whether a query multimedia object from which the query fingerprint is derived is identified with a reference multimedia object from which a reference fingerprint in the multimedia fingerprints is derived; or
  a number of weak bits in the second fingerprint bits in each of the reference fingerprints, wherein a weak bit in the second fingerprint bits has a higher probability to change than a non-weak bit in the second fingerprint bits when a multimedia object, from which the second fingerprint bits are derived, is modified;
wherein one or more of the fingerprint length, the index length, the threshold, or the number of the weak bits are assigned one or more different values at a first time from one or more values assigned to the one or more of the fingerprint length, the index length, the threshold or the number of the weak bits at a second different time;
wherein the dynamic configuration step comprises the steps of:

automatically determining and assigning values to one or more of the fingerprint length, the index length, the threshold or the number of the weak bits;

subsequently using the values of the one or more of the fingerprint index length, the threshold, or the number of the weak bits to determine matches between one or more query fingerprints derived from one or more query multimedia objects and the reference fingerprints in the multimedia fingerprint databases.

14. A system, comprising:

means for maintaining a multimedia fingerprint database that stores reference fingerprints in one or more storage devices, wherein each of the reference fingerprints comprises up to a maximum fingerprint length of fingerprint bits;

wherein means for maintaining the multimedia fingerprint database comprises means for dynamically configuring one or more of search parameters for searching the multimedia fingerprint database, the search parameters comprising:

a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;

an index length, wherein the index length is not greater than the fingerprint length and represents a number of second fingerprint bits, in each of the reference fingerprints, that are used for indexing the reference fingerprints in the multimedia fingerprint database;

a threshold, wherein the threshold is to be used for determining whether a query multimedia object from which the query fingerprint is derived is identified with a reference multimedia object from which a reference fingerprint in the multimedia fingerprints is derived; or a number of weak bits in the second fingerprint bits in each of the reference fingerprints, wherein a weak bit in the second fingerprint bits has a higher probability to change than a non-weak bit in the second fingerprint bits when a multimedia object, from which the second fingerprint bits are derived, is modified;

wherein one or more of the fingerprint length, the index length, the threshold, or the number of the weak bits are assigned one or more different values at a first time from one or more values assigned to the one or more of the fingerprint length, the index length, the threshold or the number of the weak bits at a second different time;

wherein the dynamic configuration means comprises:

means for automatically determining and assigning values to one or more of the fingerprint length, the index length, the threshold or the number of the weak bits;

means for subsequently using the values of the one or more of the fingerprint length, the index length, the threshold, or the number of the weak bits to determine matches between one or more query fingerprints derived from one or more query multimedia objects and the reference fingerprints in the multimedia fingerprint databases.

15. An apparatus comprising:

one or more processors; and one or more non-transitory storage media, comprising a set of instructions stored therewith which, when executed by the one or more processors, causes performance of a process, the process comprising the steps of:

maintaining a multimedia fingerprint database that stores reference fingerprints in one or more storage devices, wherein each of the reference fingerprints comprises up to a maximum fingerprint length of fingerprint bits;

wherein maintaining the multimedia fingerprint database comprises dynamically configuring one or more of search parameters for searching the multimedia fingerprint database, the search parameters comprising:

a fingerprint length, wherein the fingerprint length is not greater than the maximum fingerprint length and represents a number of first fingerprint bits, in each of the reference fingerprints stored in the multimedia fingerprint database, that are to be used for matching with a query fingerprint;

an index length, wherein the index length is not greater than the fingerprint length and represents a number of second fingerprint bits, in each of the reference fingerprints, that are used for indexing the reference fingerprints in the multimedia fingerprint database;

a threshold, wherein the threshold is to be used for determining whether a query multimedia object from which the query fingerprint is derived is identified with a reference multimedia object from which a reference fingerprint in the multimedia fingerprints is derived; or a number of weak bits in the second fingerprint bits in each of the reference fingerprints, wherein a weak bit in the second fingerprint bits has a higher probability to change than a non-weak bit in the second fingerprint bits when a multimedia object, from which the second fingerprint bits are derived, is modified;

wherein one or more of the fingerprint length, the index length, the threshold, or the number of the weak bits are assigned one or more different values at a first time from one or more values assigned to the one or more of the fingerprint length, the index length, the threshold or the number of the weak bits at a second different time;

wherein the dynamic configuration step comprises the steps of:

automatically determining and assigning values to one or more of the fingerprint length, the index length, the threshold or the number of the weak bits;

subsequently using the values of the one or more of the fingerprint length, the index length, the threshold, or the number of the weak bits to determine matches between one or more query fingerprints derived from one or more query multimedia objects and the reference fingerprints in the multimedia fingerprint databases.

\* \* \* \* \*